United States Patent
Wang et al.

(10) Patent No.: US 11,726,200 B2
(45) Date of Patent: Aug. 15, 2023

(54) ADAPTIVE HYBRID TRACKING ALGORITHMS FOR RADIO SIGNAL PARAMETERS ESTIMATIONS

(71) Applicant: The Regents of the University of Colorado, a body corporate, Denver, CO (US)

(72) Inventors: Yang Wang, Boulder, CO (US); Yu T. Morton, Boulder, CO (US)

(73) Assignee: The Regents of the University of Colorado, A Body Corporate, Denver, CO (US)

( * ) Notice: Subject to any disclaimer, the term of this patent is extended or adjusted under 35 U.S.C. 154(b) by 384 days.

(21) Appl. No.: 17/141,450

(22) Filed: Jan. 5, 2021

(65) Prior Publication Data

US 2021/0223387 A1     Jul. 22, 2021

Related U.S. Application Data

(60) Provisional application No. 62/963,713, filed on Jan. 21, 2020.

(51) Int. Cl.
*G01S 13/89*     (2006.01)
*G01S 19/22*     (2010.01)
*G01S 13/00*     (2006.01)

(52) U.S. Cl.
CPC ............ *G01S 13/89* (2013.01); *G01S 13/003* (2013.01); *G01S 19/22* (2013.01)

(58) Field of Classification Search
CPC ......... G01S 13/89; G01S 13/003; G01S 19/22
(Continued)

(56) References Cited

U.S. PATENT DOCUMENTS 9,455,762 B2 *   9/2016   Mathews ............... G01S 19/256
9,891,325 B2 *   2/2018   Milyutin ................. G01S 19/43
(Continued)

FOREIGN PATENT DOCUMENTS

EP         3349032 A1 *   7/2018  ............. G01S 13/74
JP        2020020802 A *   2/2020  ........... G01S 13/222

OTHER PUBLICATIONS

C. D. Hall and R. A. Cordey, "Multistatic scatterometry," in Proc. IEEE Int. Geosci. Remote Sens. Symp., vol. 1, Sep. 1988, pp. 561-562.
(Continued)

*Primary Examiner* — Nuzhat Pervin
(74) *Attorney, Agent, or Firm* — Kasha Law LLC; John R. Kasha; Kelly L. Kasha

(57) ABSTRACT

A direct line-of-sight (DLOS) radio frequency (RF) signal component and a reflected RF signal component of an RF carrier signal are received from a transmitter. The reflected component is reflected from a point on the surface of the earth. The DLOS component is converted to a digital DLOS intermediate frequency (IF) signal and the reflected component that is converted to a digital reflected IF signal. Modeled reference signal parameters are generated using the digital DLOS IF signal and known locations of the one or more antennas, the transmitter, and the point. A reference signal is generated based on the modeled reference signal parameters and feedback of a previously estimated phase correction ($\Delta\phi$). The reference signal is correlated with the digital reflected IF signal to produce in-phase and quadrature-phase correlation results. Estimated carrier-to-noise ratio ($C/N_0$) and $\Delta\phi$ values are calculated for the digital reflected IF signal from the correlation results.

20 Claims, 16 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 10,228,468 | B1* | 3/2019 | Wang | G01S 19/22 |
| 2002/0015439 | A1* | 2/2002 | Kohli | G01C 22/00 |
| | | | | 375/150 |
| 2002/0146065 | A1* | 10/2002 | Kohli | H04B 1/709 |
| | | | | 375/150 |
| 2004/0136446 | A1* | 7/2004 | Kohli | G01S 19/22 |
| | | | | 375/150 |
| 2004/0202235 | A1* | 10/2004 | Kohli | G01C 22/00 |
| | | | | 375/150 |
| 2009/0016414 | A1* | 1/2009 | Lillo | G01S 19/47 |
| | | | | 375/150 |
| 2010/0279732 | A1* | 11/2010 | Hjelm | G01S 19/30 |
| | | | | 455/552.1 |
| 2014/0062781 | A1* | 3/2014 | Mathews | G01S 11/10 |
| | | | | 342/357.64 |
| 2016/0033649 | A1* | 2/2016 | Mathews | G01S 19/246 |
| | | | | 342/357.48 |
| 2017/0227625 | A1* | 8/2017 | Markhovsky | G01S 5/0226 |
| 2017/0248678 | A1* | 8/2017 | Markhovsky | G01S 5/0257 |
| 2019/0242967 | A1* | 8/2019 | Markhovsky | G01S 13/74 |
| 2019/0261137 | A1* | 8/2019 | Markhovsky | G01S 5/0273 |
| 2020/0142023 | A1* | 5/2020 | Markhovsky | G01S 5/0218 |

OTHER PUBLICATIONS

M. Martin-Neira, "A passive reflectometry and interferometry system (PARIS): Application to ocean altimetry," Esa J., vol. 17, No. 4, pp. 331-355, 1993.
M. Unwin, S. Gleason, and M. Brennan, "The space GPS reflectometry experiment on the UK disaster monitoring constellation satellite," in Proc. ION-GPS/GNSS, 2003, pp. 2656-2663.
S. Gleason et al., "Detection and processing of bistatically reflected GPS signals from low Earth orbit for the purpose of ocean remote sensing," IEEE Trans. Geosci. Remote Sens., vol. 43, No. 6, pp. 1229-1241, Jun. 2005.
M. Unwin, P. Jales, J. Tye, C. Gommenginger, G. Foti, and J. Rosello, "Spaceborne GNSS-reflectometry on TechDemoSat-1: Early mission operations and exploitation," IEEE J. Sel. Topics Appl. Earth Observ. Remote Sens., vol. 9, No. 10, pp. 4525-4539, Oct. 2016.
G. Foti et al., "Spaceborne GNSS reflectometry for ocean winds: First results from the UK TechDemoSat-1 mission," Geophys. Res. Lett., vol. 42, No. 13, pp. 5435-5441, Jul. 2015.
H. Carreno-Luengo, S. Lowe, C. Zuffada, S. Esterhuizen, and S. Oveisgharan, "Spaceborne GNSS-R from the SMAP mission: First assessment of polarimetric scatterometry over land and cryosphere," Remote Sens., vol. 9, No. 4, p. 362, 2017.
C. S. Ruf et al., "A new paradigm in Earth environmental monitoring with the CYGNSS small satellite constellation," Sci. Rep., vol. 8, No. 1, pp. 1-13, Dec. 2018.
D. Masters, V. Zavorotny, S. Katzberg, and W. Emery, "GPS signal scattering from land for moisture content determination," in Proc. IGARSS . IEEE Int. Geosci. Remote Sens. Symp. Taking Pulse Planet, Role Remote Sens. Manag. Environ., vol. 7, 2000, pp. 3090-3092.
A. Camps et al., "Sensitivity of GNSS-R spaceborne observations to soil moisture and vegetation," IEEE J. Sel. Topics Appl. Earth Observ. Remote Sens., vol. 9, No. 10, pp. 4730-4742, Oct. 2016.
C. C. Chew and E. E. Small, "Soil moisture sensing using spaceborne GNSS reflections: Comparison of CYGNSS reflectivity to SMAP soil moisture," Geophys. Res. Lett., vol. 45, No. 9, pp. 4049-4057, May 2018.
H. Carreno-Luengo, G. Luzi, and M. Crosetto, "Sensitivity of CyGNSS bistatic reflectivity and SMAP microwave radiometry brightness temperature to geophysical parameters over land surfaces," IEEE J. Sel. Topics Appl. Earth Observ. Remote Sens., vol. 12, No. 1, pp. 107-122, Jan. 2019.
C. Chew, J. T. Reager, and E. Small, "CYGNSS data map flood inundation during the 2017 atlantic hurricane season," Sci. Rep., vol. 8, No. 1, pp. 1-8, Dec. 2018.
J. Mashburn, P. Axelrad, S. T. Lowe, and K. M. Larson, "Global ocean altimetry with GNSS reflections from TechDemoSat-1," IEEE Trans. Geosci. Remote Sens., vol. 56, No. 7, pp. 4088-4097, Jul. 2018.
J. R. Mashburn, "Analysis of GNSS-R observations for altimetry and characterization of Earth surfaces," Ph.D. dissertation, Univ Colorado Boulder, Boulder, Co, USA, 2019.
W. Li, E. Cardellach, F. Fabra, S. Ribo, and A. Rius, "Assessment of spaceborne GNSS-R ocean altimetry performance using CYGNSS mission raw data," IEEE Trans. Geosci. Remote Sens., vol. 58, No. 1, pp. 238-250, Jan. 2020.
M. Unwin, P. Jales, P. Blunt, S. Duncan, M. Brummitt, and C. Ruf, "The SGR-ReSI and its application for GNSS reflectometry on the NASA EV-2 Cygnss mission," in Proc. IEEE Aerosp. Conf., Mar. 2013, pp. 1-6.
E. Cardellach et al., "First precise spaceborne sea surface altimetry with GNSS reflected signals," IEEE J. Sel. Topics Appl. Earth Observ. Remote Sens., vol. 13, pp. 102-112,2020. [Online]. Available: https:/lieeexplore IEEE.org.
W. K. Chen, The Electrical Engineering Handbook. Amsterdam, The Netherlands: Elsevier, 2004.
H. Carreno-Luengo, A. Camps, I. Ramos-Perez, and A. Rius, "Experimental evaluation of GNSS-reflectometry altimetric precision using the P(Y) and C/A signals," IEEE J. Sel. Topics Appl. Earth Observ. Remote Sens., vol. 7, No. 5, pp. 1493-1500, May 2014.
H. Carreno-Luengo and A. Camps, "Empirical results of a surface-level GNSS-R experiment in a wave channel," Remote Sens., vol. 7, No. 6, pp. 7471-7493, 2015.
F. Martin et al., "Mitigation of direct signal cross-talk and study of the coherent component in Gnss-R," IEEE Geosci. Remote Sens. Lett., vol. 12, No. 2, pp. 279-283, Feb. 2015.
A. M. Semmling, V. Leister, J. Saynisch, F. Zus, S. Heise, and J.Wickert, "A phase-altimetric simulator: Studying the sensitivity of Earth-reflected GNSS signals to ocean topography," IEEE Trans. Geosci. Remote Sens., vol. 54, No. 11, pp. 6791-6802, Nov. 2016.
Y. Wang and Y. J. Morton, "Coherent components of GNSS-R signal observed from CYGNSS raw IF data," in Proc. 32nd Int. Tech. Meeting Satell. Division Inst. Navigat. (ION GNSS), Oct. 2019, pp. 3319-3326.
H. Carreno-Luengo and A. Camps, "First dual-band multiconstellation GNSS-R scatterometry experiment over boreal forests from a stratospheric balloon," IEEE J. Sel. Topics Appl. Earth Observ. Remote Sens., vol. 9, No. 10, pp. 4743-4751, Oct. 2016.
A. Camps, "Spatial resolution in GNSS-R under coherent scattering," IEEE Geosci. Remote Sens. Lett., vol. 17, No. 1, pp. 32-36, Jan. 2020.
L. Keesey. SNoOPI: A Flying Ace for Soil Moisture and Snow Measurements. Accessed: May 15, 2020. [Online]. Available: https:// www.nasa. gov/feature/goddard/2019/snoopi-a-flying-ace-for-soil-moisture-andsnow-measurements.
W. Li, E. Cardellach, F. Fabra, A. Rius, S. Ribó, and M. Martin-Neira, "First spaceborne phase altimetry over sea ice using TechDemoSat 1 GNSS-R signals," Geophys. Res. Lett., vol. 44, No. 16, pp. 8369-8376, Aug. 2017.
W. Li, E. Cardellach, F. Fabra, S. Ribó, and A. Rius, "Lake level and surface topography measured with spaceborne GNSS-reflectometry from CYGNSS mission: Example for the Lake Qinghai," Geophys. Res. Lett., vol. 45, No. 24, pp. 13,332-13,341, Dec. 2018.
Y. Wang, R. Yang, and Y. T. Morton, "Kalman filter-based robust closed-loop carrier tracking of airborne GNSS radio-occultation signals," IEEE Trans. Aerosp. Electron. Syst., early access, Feb. 7, 2020, doi: 10.1109/TAES.2020.2972248.
C. Roesler, Y. Wang, Y. Morton, and R. S. Nerem, "Coherent GPS reflections over ocean surface," in Proc. IGARSS, Jul. 2020.
Y. Wang, Y. Liu, C. Roesler, and Y. Morton, "Detection of coherent GNSS-R measurements using a support vector machine," in Proc IGARSS, Jul. 2020.

(56) References Cited

OTHER PUBLICATIONS

J. B.-Y. Tsui, Fundamentals of Global Positioning System Receivers: A Software Approach . Hoboken, NJ, USA: Wiley, 2005.

B. J. Southwell and A. G. Dempster, "A new approach to determine the specular point of forward reflected GNSS signals," IEEE J. Sel. Topics Appl. Earth Observ. Remote Sens., vol. 11, No. 2, pp. 639-646, Feb. 2018.

O. Andersen, P. Knudsen, and L. Stenseng, "The DTU13 MSS (mean sea surface) and MDT (mean dynamic topography) from 20 years of satellite altimetry," in Proc. IGFS, 2015, pp. 111-121.

T. G. Farr and M. Kobrick, "Shuttle radar topography mission produces a wealth of data," Eos, Trans. Amer. Geophys. Union, vol. 81, No. 48, p. 583, 2000.

G. Beyerle and F. Zus, "Open-loop GPS signal tracking at low elevation angles from a ground-based observation site," Atmos. Meas. Techn., vol. 10, No. 1, pp. 15-34, 2017.

M. Sharawi, D. Akos, and D. Aioi, "GPS C/N0 estimation in the presence of interference and limited quantization levels," IEEE Trans. Aerosp. Electron. Syst., vol. 43, No. 1, pp. 227-238, Jan. 2007.

D. Xu and Y. Morton, "A semi-open loop GNSS carrier tracking algorithm for monitoring strong equatorial scintillation," IEEE Trans. Aerosp. Electron. Syst., vol. 54, No. 2, pp. 722-738, Apr. 2018.

R. Yang, K.-V. Ling, E.-K. Poh, and Y. Morton, "Generalized GNSS signal carrier tracking: Part I—Modeling and analysis," IEEE Trans. Aerosp. Electron. Syst., vol. 53, No. 4, pp. 1781-1797, Aug. 2017.

R. Yang, Y. Morton, K.-V. Ling, and E.-K. Poh, "Generalized GNSS signal carrier tracking—Part II: Optimization and implementation," IEEE Trans. Aerosp. Electron. Syst., vol. 53, No. 4, pp. 1798-1811, Aug. 2017.

G. Welch and G. Bishop, An Introduction to the Kalman Filter. Chapel Hill, NC, USA: Univ. North Carolina, 2001.

C. O'Driscoll, M. G. Petovello, and G. Lachapelle, "Choosing the coherent integration time for Kalman filter-based carrier-phase tracking of GNSS signals," GPS Solutions, vol. 15, No. 4, pp. 345-356, Oct. 2011.

E. Kaplan and C. Hegarty, Understanding GPS: Principles and Applications. Norwood, MA, USA: Artech House, 2005.

CYGNSS Level 2 Science Data Record Version 2.1. Version 2.1., Dataset, CYGNSS, PO.DAAC, Boulder, CO, USA, 2018, doi: 10.5067/CYGNSL2X21.

\* cited by examiner

ADAPTIVE HYBRID TRACKING ALGORITHMS FOR RADIO SIGNAL PARAMETERS ESTIMATIONS

RELATED APPLICATIONS

This application claims the benefit of U.S. Provisional Patent Application Ser. No. 62/963,713, filed on Jan. 21, 2020, the content of which is incorporated by reference herein in its entirety.

GOVERNMENT INTEREST

This invention was made with government support under grant number NNX15AT54G awarded by NASA. The government has certain rights in the invention.

TECHNICAL FIELD

The teachings herein relate to operating a receiver to estimate parameters of a radio frequency (RF) carrier signal reflected from the earth's surface in order to measure topographical features on the earth's surface. More particularly, the teachings herein relate to systems and methods for estimating the carrier-to-noise ratio ($C/N_0$) and phase correction ($\Delta\phi$) of a reflected RF carrier signal. The systems and methods disclosed herein can be performed in conjunction with a processor, controller, microcontroller, or computer system, such as the computer system of FIG. 1.

BACKGROUND

Remote sensing is used to measure topographical features on the earth's surface. Remote sensing satellite and airborne devices have traditionally been used to measure topographical features with heights on the order of kilometers (km) and even meters (m) because they can provide global coverage. However, for topographical features with heights on the order of centimeters (cm), additional devices in conjunction with satellite and airborne devices have traditionally been used. For example, geodetic global navigation satellite system (GNSS) receivers on buoys in conjunction with the GNSS satellites have been used to measure centimetric sea surface wave heights. Unfortunately, however, additional devices, such as receivers on buoys, can only provide point-wise measurements.

As a result, systems and methods have been developed to improve the measurement capability of remote sensing satellite and airborne devices. For example, satellite and airborne GNSS receivers are designed to calculate a pseudorange based on the parameters (information) in the received GNSS signal. However, the calculated pseudorange can only provide height measurements on the order of tens of meters or, at best, on the order of meters. Consequently, the pseudorange cannot be used to provide centimetric height measurements.

GNSS and other types of navigation or communication satellite or airborne systems, however, also include a carrier signal. Calculating the phase of the carrier signal of such systems can be used to determine height measurements on the order of centimeters. In other words, carrier radio signals transmitted from satellites or other airborne platforms, though designed for navigation or communication purposes, can be used to sense signal propagation environments with a resolution on the order of centimeters. This is because the carrier signals contain information about the properties of the signal propagation medium. Some commonly used signals include GNSS signals (such as GPS, GLONASS, Galileo, and Beidou, etc.) and communication satellite signals.

Global navigation satellite system reflectometry (GNSS-R) is one such remote sensing application where GNSS carrier signals reflected from the earth's surface such as ocean and land cover are used to derive the properties of the reflection surface. For example, reflections from ocean surface can be used to derive ocean wind speed, roughness, wave heights, sea ice thickness, salinity, and sea-level changes; reflections from land cover can be used to infer soil moisture, snow-water-equivalent (SWE), and vegetation states.

FIG. 2 is an exemplary diagram 200 showing components of a GNSS-R system, upon which embodiments of the present teachings may be implemented. Direct line-of-sight (DLOS) GNSS signals and reflected GNSS signals from earth surface 201 are received by a GNSS-R receiver mounted on low earth orbit (LEO) satellite platform 220. The reflected GNSS signal may contain valuable information about the reflection surface, and, in the meanwhile, the reflection surface may have a significant impact on the signal characteristics. For example, the GNSS signal reflected over the ocean surface may contain information about the ocean surface height. If the ocean surface is relatively calm, the reflected GNSS signals over it tend to be coherent, and it would be possible to obtain high-precision (centimeter-level) observations of the ocean surface height.

Signal transmitters 210, 211, 212, 213, and 214 represent the GNSS satellites. The receiver of LEO satellite-based GNSS-R receiver platform 220 includes, for example, two antennas to receive the DLOS signal and the reflected signal, respectively. GNSS signals 230, 231, 232, 233, and 234 travel directly from the GNSS satellite transmitters 210, 211, 212, 213, and 214, respectively, to LEO satellite-based GNSS-R receiver platform 220. GNSS signal 230A, for example, travels from the GNSS satellite transmitter 210 to ocean surface 202 on earth 201. GNSS signal 230B results from GNSS signal 230A after being reflected by ocean surface 202 at point 240. GNSS signal 230B travels from ocean surface 202 to LEO satellite-based GNSS-R receiver platform 220. Specular point (SP) 240 represents the location where GNSS signal 230A is reflected.

The current operational GNSSs include the global positioning system (GPS), the Galileo navigation system, the global navigation satellite system (GLONASS), the BeiDou navigation satellite system, and other regional satellite navigation systems. Signal transmitters 210, 211, 212, 213, and 214 are designed to broadcast radio signals at certain frequencies. For example, current operational GPS satellites broadcast three civil signals simultaneously, i.e., L1C/A, L2C, and L5, at 1575.42 MHz, 1227.6 MHz, and 1176.45 MHz bands, respectively.

The receiver of platform 220 usually has two or more antennas, a zenith-looking antenna to receive the DLOS GNSS signals 230, 231, 232, 233, and 234 and one or several nadir-looking or horizontal-looking antennas to receive GNSS signal 230B and other reflected signals from earth 201.

The receiver of platform 220 processes GNSS signals usually at two or more frequencies, for example, GPS L1 and L2. This means the GNSS signals 230, 230A, 230B, 231, 232, 233, and 234 contain signal components at two or more frequencies. The DLOS signals 230, 231, 232, 233, and 234 are used for the precise orbit determination (POD) of LEO satellite-based platform 220.

Coherent reflection occurs when the reflection surface is smooth. If the roughness of the reflection surface is comparable to or larger than a signal wavelength, the reflection is noncoherent. Unfortunately, reflections from an ocean surface, such as surface 202, often contain very little coherent signal components, because the ocean surface is relatively rough and the GNSS carrier wavelengths are in the order of a few 10s of centimeters. Much of the current state-of-the-art technologies work with noncoherent reflections. It is, however, the coherent signal component that enables accurate range measurement retrieval (cm-level) and high spatial and temporal resolution.

FIG. 3 is an exemplary diagram 300 showing coherent and noncoherent reflections of carrier signals from smooth and rough surfaces respectively to a receiver, upon which embodiments of the present teachings may be implemented. GNSS signals 310 are transmitted by one or more GNSS satellite transmitters (not shown) and are reflected by smooth surface 301 or rough surface 302 towards LEO satellite-based GNSS-R receiver platform 320. Smooth surface 301 produces coherent reflected signals 311, and rough surface 302 produces noncoherent reflected signals 312, for example. LEO satellite-based GNSS-R receiver platform 320 also receives DLOS signals 313 from the one or more GNSS satellite transmitters.

The low signal-to-noise ratio (SNR) and the large signal amplitude fluctuations caused by multipath interferences in the ocean reflected coherent signal impose great challenges in the receiver carrier signal processing. In addition, the carrier signal is transmitted by satellites or airborne devices moving at enormous speeds. As a result, carrier signal processing is also affected by frequency shifting due to the Doppler effect. In other words, in order to obtain centimetric height measurements from coherent carrier signal processing, a receiver must overcome challenges imposed by low signal SNR, large signal amplitude fluctuations, and signal frequency shifts due to the Doppler effect.

At least two methods of carrier signal processing were previously developed to account for low signal SNR, large signal amplitude fluctuations, and signal frequency shifts due to the Doppler effect. Both of these methods are performed by an RF receiver during the carrier tracking portion of intermediate frequency (IF) signal processing.

FIG. 4 is an exemplary block diagram 400 of a GNSS-R receiver showing the location of IF signal processing, upon which embodiments of the present teachings may be implemented. Antenna system 401 represents a multi-frequency antenna adapted to signal frequencies, such as GPS L1 and L2, with right-hand circular polarization (RHCP). Antenna system 402 represents a multi-frequency antenna adapted to signal frequencies, such as GPS L1 and L2, with left-hand circular polarization (LHCP). Antenna system 402 may also be a phased array antenna.

RF front-end 410 is configured to perform signal conditioning and down-conversions, where the signal spectrum is moved from RF to an IF or a baseband frequency. RF front-end 410 may include one or more signal down-converters (not shown) that can be configured to multiple frequency signals driven by a common local oscillator (not shown). The analog multi-frequency outputs from RF front-end 410 can be digitized and quantized in analog-to-digital converter (ADC) 420.

The output from ADC 420, i.e., the digitalized IF or baseband signals, is input to IF signal processing system 430, which is used to estimate the signal parameters of the input IF signal, decode the navigation data bits, and obtain receiver position, velocity, and time (PVT) solutions.

The output from IF signal processing system 430, i.e., signal parameter estimations of both DLOS and reflected signals, the PVT of the receiver platform, and the orbit parameters of the transmitter platform is input to the scientific parameters retrieval module 440.

Scientific parameters retrieval module 440 is used to retrieve scientific parameters, such as water level height, soil moisture, etc.

FIG. 5 is an exemplary block diagram 500 showing the IF signal processing in a GNSS-R receiver used to account for low signal SNR, large signal amplitude fluctuations, and signal frequency shifts due to the Doppler effect, upon which embodiments of the present teachings may be implemented. The IF signal processing in FIG. 5 includes three separate functions. These are direct or DLOS signal processing 510, reflected signal code phase delay and Doppler frequency modeling 520, and reflected signal processing 530.

In DLOS signal processing function 510, GNSS software receiver 512 receives DLOS GNSS signals 511, processes DLOS GNSS signals 511 using phase-lock loops (PLL) for carrier tracking and delay-lock loops (DLL) for code phase tracking, and generates parameters 513, including PVT parameters for the LEO satellite-based receiver platform, signal parameters of DLOS GNSS signals 511 (i.e., code delay, Doppler frequency, carrier phase), and decoded navigation bits, etc.

In reflected signal code phase and Doppler frequency modeling function 520, models 522 of the code delay and Doppler frequency of the reflected signal are created. Models 522 are created based on an estimated position 521 of the SP. A minimum path length method is used to estimate the SP position by minimizing the reflected path length while constraining the SP to the earth's surface. The earth's surface is modeled with a WGS84 ellipsoid or a mean sea surface (MSS) model, for example.

In reflected signal processing function 530, code tracking 531 and carrier tracking 532 are performed. In code tracking 531, pseudorandom noise codes (PRN) are shifted in the time domain and correlated with reflected signal 533 to produce code delay estimates. Based on the code delay estimates, range observation 534 is obtained (with precision in meters or tens of meters) and applied for altimetry-related GNSS-R applications.

In carrier tracking 532, the objective is to measure parameters 535 (the total carrier phase and the amplitude or $C/N_0$) of received reflected signal 533. With the carrier phase measurement, range observation at the centimeter level can be obtained. However, as described above, carrier tracking 532 is sensitive to low $C/N_0$ and rapid phase changes. In addition, received reflected signal 533 is often adversely affected by multipath scattering and the degradation from the earth's surface reflection.

One method of carrier tracking developed to account for low signal $C/N_0$, large signal amplitude fluctuations, and signal frequency shifts due to the Doppler effect is called master-slave open-loop (MS-OL) processing. In MS-OL processing, a carrier signal replica for the reflected signal is generated based on a Doppler model, which is based on the GNSS satellite orbit, receiver platform PVT solution, and the DLOS tracking results. The carrier signal replica is then correlated with the reflected GNSS signal.

FIG. 6 is an exemplary block diagram 600 showing MS-OL carrier tracking processing, upon which embodiments of the present teachings may be implemented. In FIG. 6, generator 610 generates a carrier signal replica based on Doppler model 522. Doppler model 522 is created in reflected signal code phase and Doppler frequency modeling function 520 of FIG. 5, for example.

Returning to FIG. 6, correlator function 620 correlates the carrier signal replica with reflected GNSS signal 630. In-phase (I) and quadrature (Q) correlation outputs are obtained from the correlation. $C/N_0$ 640 of reflected GNSS signal 630 is estimated from the I and Q correlation outputs based on a power ratio method or a signal intensity-based approach, for example.

Discriminator function 650 applies a four-quadrant discriminator to the I and Q correlation outputs to produce a $\Delta\phi$. The $\Delta\phi$ is used by phase correction function 660 to produce phase range measurement 670, which can be defined as the carrier phase multiplied by the carrier wavelength. Phase range measurement 670 is used to calculate a centimetric ocean surface height, for example.

The MS-OL carrier tracking method, as shown in FIG. 6, is simple to implement and has excellent robustness. However, it does not have a filter in the tracking loop. As a result, when $C/N_0$ 640 is low or when reflected carrier signal 630 experiences multipath interferences, the MS-OL tracking results can be noisy, and the errors produced by discriminator function 650 can accumulate in the carrier phase observation and cause numerous phase discontinuities.

FIG. 7 is an exemplary plot 700 of the $C/N_0$ and the $\Delta\phi$ of a reflected GNSS carrier signal estimated using MS-OL carrier tracking processing, upon which embodiments of the present teachings may be implemented. In plot 700, estimated data values $C/N_0$ and $\Delta\phi$ are plotted as a function of time. The time values represent different specular points on the surface of the earth from which a reflected component of the RF carrier signal was analyzed. FIG. 7 shows that, when $C/N_0$ spikes lower, MS-OL tracking can produce discontinuities in $\Delta\phi$. For example, at time 710, the large decrease in $C/N_0$ causes a discontinuity in $\Delta\phi$.

In order to overcome the noisy tracking results produced by MS-OL carrier tracking processing, another method of carrier tracking called adaptive closed-loop (ACL) processing was developed. When properly tuned, ACL processing provides improved accuracy and fewer phase discontinuities in carrier phase measurements as compared to MS-OL processing or the conventional closed-loop PLL processing.

FIG. 8 is an exemplary block diagram 800 showing ACL carrier tracking processing, upon which embodiments of the present teachings may be implemented. FIG. 8 shows that ACL processing has two main differences from the MS-OL processing shown in FIG. 6. First, ACL processing does not rely on a Doppler model. Instead, the reference signal is generated based on the feedback from a previously estimated carrier phase and Doppler frequency 880. Second, the carrier tracking problem is reformulated into a closed-loop feedback control problem. Coding and carrier generator 810 obtains an estimation of a state vector based on signal dynamics and measurement instead of a simple phase correction, as is done in MS-OL processing.

In particular, coding and carrier generator 810 generates local carrier replicas using the predicted state vector. The state vector consists of a carrier phase, Doppler frequency, and Doppler frequency rate.

As in MS-OL processing, correlator function 820 correlates the carrier signal replicas with reflected GNSS signal 830. In-phase (I) and quadrature (Q) correlation outputs are obtained from the correlation. Again, $C/N_0$ 840 of reflected GNSS signal 830 can be estimated from the I and Q correlation outputs based on a power ratio method or a signal intensity-based approach, for example.

Discriminator function 850 applies a four-quadrant discriminator to the I and Q correlation outputs to produce a $\Delta\phi$. The $\Delta\phi$ is used by estimator function 860 to produce phase range and Doppler frequency estimates 880.

The state vector used by coding and carrier generator 810 is estimated using a standard Kalman filter (KF), for example. The use of a KF makes ACL processing highly dependent on tuning the KF. For example, in tuning the KF, process noise covariance matrices must be selected and noise variance must be measured. The noise covariance matrices are selected based on empirical phase noise model 870 and the noise variance is measured based on $C/N_0$ 840, for example.

The ACL carrier tracking method, as shown in FIG. 8, provides improved results by taking advantage of the characteristics of signal dynamics and adaptive filter tuning based on a real-time estimated $C/N_0$. However, one problem with using ACL processing for GNSS-R signal tracking is that its performance is dependent on accurate initialization and tuning of the filter. ACL processing can lose lock of the reflected signal when there is not a sufficient amount of coherent signal. The amount of coherent reflection varies with the elevation angle, the reflection surface conditions, etc. Therefore, a strong coherent component does not consistently exist in the GNSS-R signal. As a result, ACL processing has traditionally been used for postprocessing data. In other words, ACL processing has traditionally been impractical for onboard operation in real-time.

In summary, MS-OL carrier tracking processing is simple and robust. However, when $C/N_0$ is low or when the reflected carrier signal experiences multipath interferences, the MS-OL tracking results can be noisy, and the errors produced can accumulate in the carrier phase observation and cause numerous phase discontinuities. ACL carrier tracking processing provides improved results by taking advantage of the characteristics of signal dynamics and adaptive filter tuning based on a real-time estimated $C/N_0$. However, ACL processing can lose lock of the reflected signal when there is not a sufficient amount of coherent signal.

As a result, additional systems and methods are needed to provide signal tracking of reflected carrier signals without phase discontinuities and without losing lock of the reflected signals.

SUMMARY

Various embodiments disclosed herein relate to systems, methods, and techniques for tracking coherent reflection signals received on different types of dynamic platforms.

The radio receiver can be mounted on a low earth orbit (LEO) satellite, an airborne, or a ground-based platform, etc. The receiver system includes one antenna to receive the DLOS signals and one or more other antenna(s) to receive the reflected signals from the earth's surface but transmitted from the same radio source. In some circumstances, both DLOS signals from the source and reflected signals from the earth's surface can be received by a single antenna. The received signals reflected from the earth's surface, such as ocean and land, are used to derive the properties of the reflection surface, such as water level height, sea ice thickness, soil moisture, etc. For signals of coherent reflections, various embodiments can implement a signal tracking procedure and obtain high-precision, high-resolution carrier phase-based range measurements.

In various embodiments, systems and methods for adaptive hybrid tracking (AHT) are used to estimate the carrier signal parameters, i.e., Doppler frequency and carrier phase, of the reflected radio signal received by the receiver after being down-converted to an IF and digitalized. In some embodiments, systems and methods for AHT formulate a feedback loop and an estimation problem. These systems and methods utilize estimated signal parameters, such as the modulation code phase and Doppler frequency, of the DLOS signal, the specular reflection model, and the carrier phase feedback to generate the local reference signal. These systems and methods adopt an estimator to estimate the carrier signal parameters of reflected radio signal based on the signal dynamics model, the carrier phase error measurement, and the measurement model.

In some embodiments, the code tracking of the reflected signal is implemented as open-loop (OL) tracking. Typical platforms are equipped with sensors and capabilities such as a navigation processor that may use the DLOS signals to determine the receiver platform PVT.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

The phrases "in various embodiments," "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

BRIEF DESCRIPTION OF THE DRAWINGS

The skilled artisan will understand that the drawings, described below, are for illustration purposes only. The drawings are not intended to limit the scope of the present teachings in any way.

Figure 1:
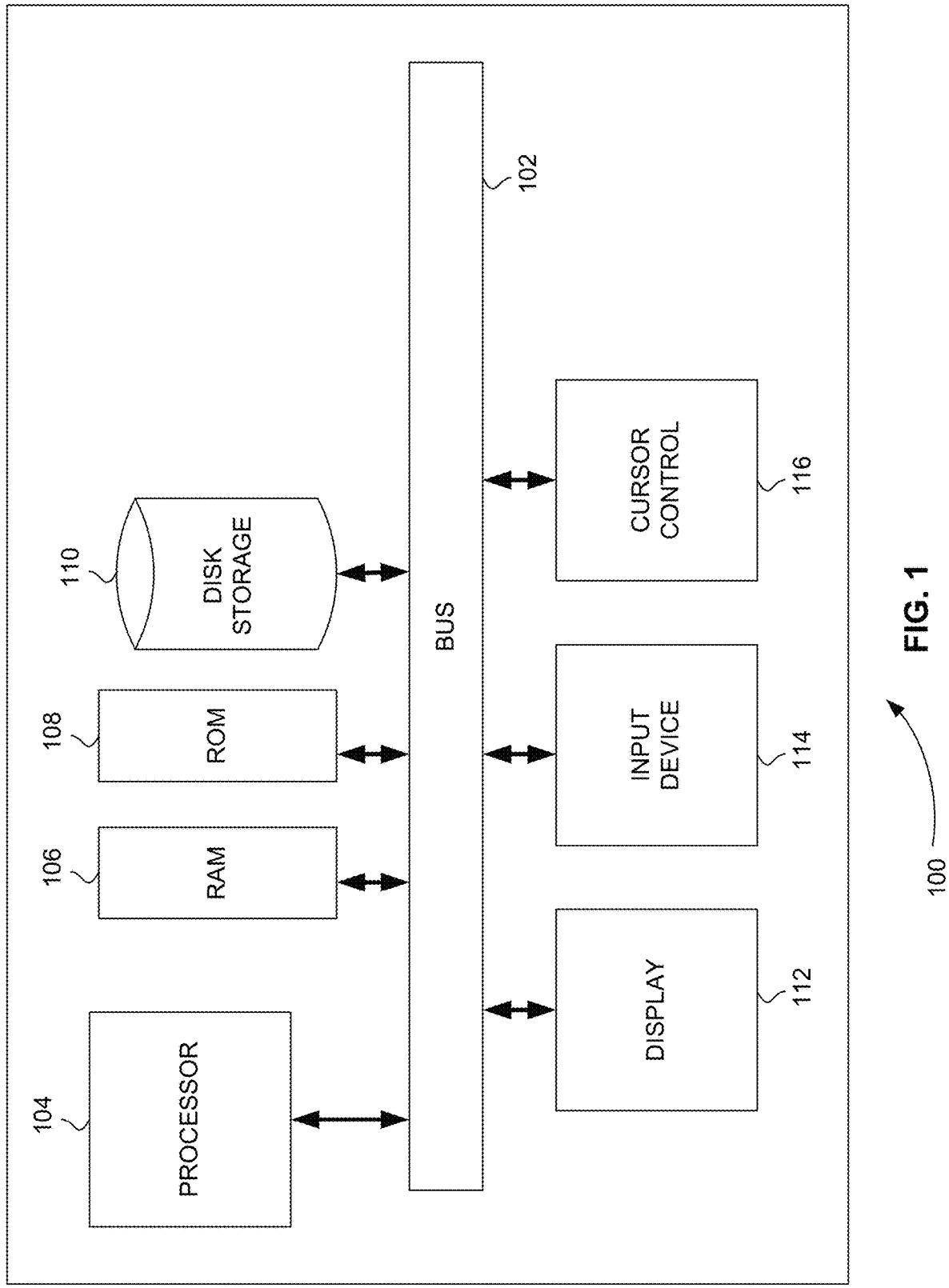
FIG. 1 is a block diagram that illustrates a computer system, upon which embodiments of the present teachings may be implemented.
Figure 2:
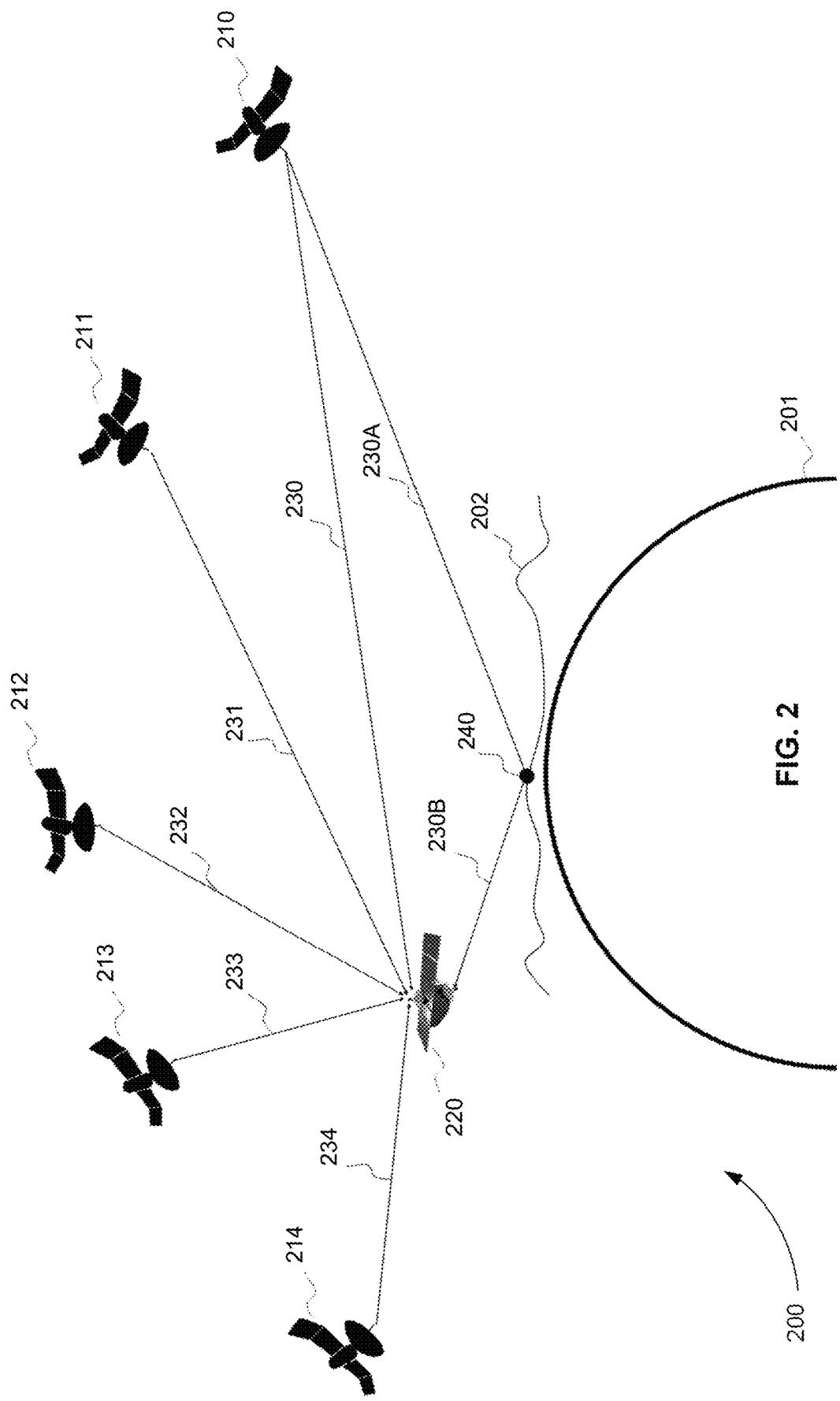
FIG. 2 is an exemplary diagram showing components of a GNSS-R system, upon which embodiments of the present teachings may be implemented.
Figure 3:
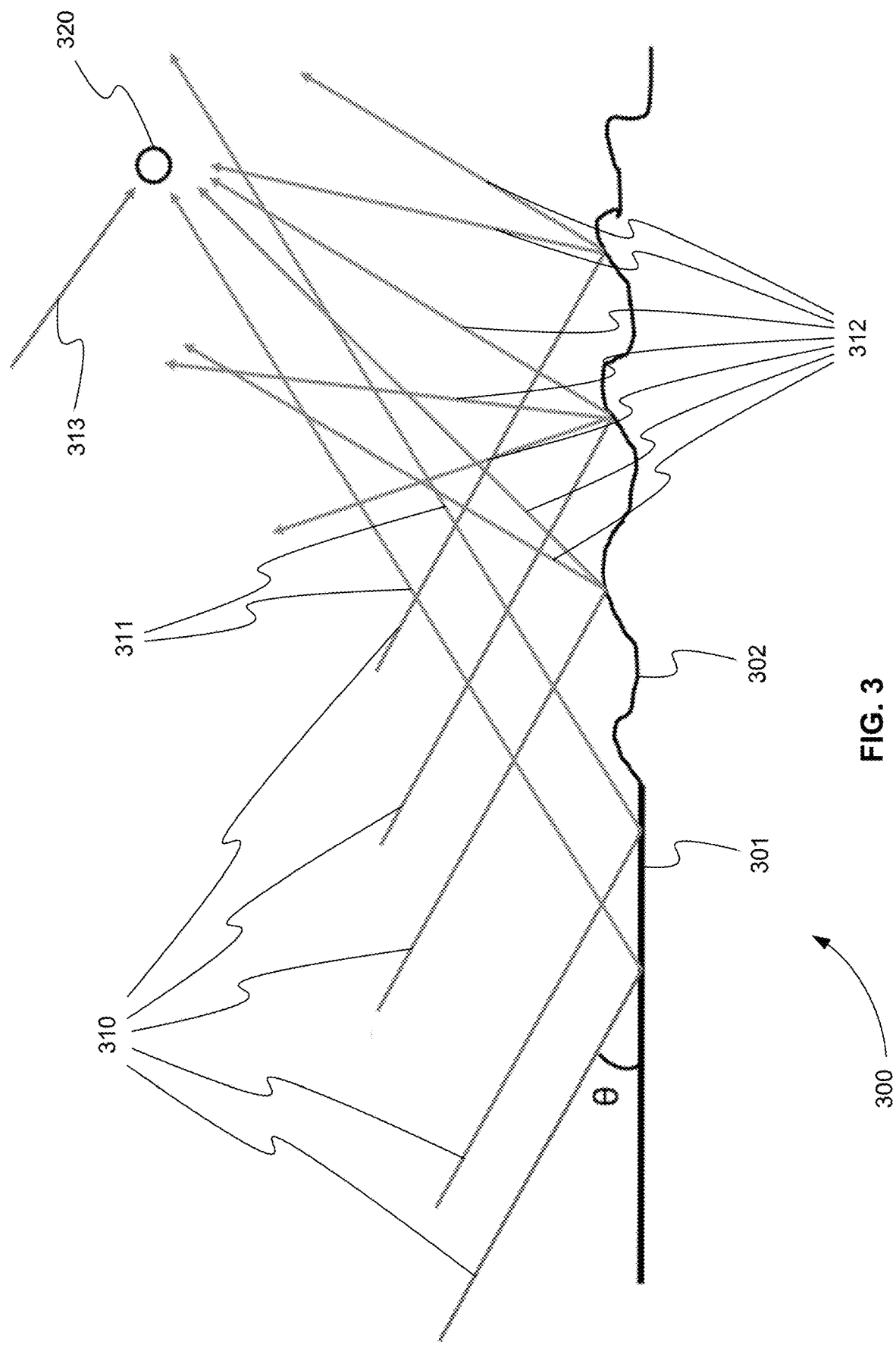
FIG. 3 is an exemplary diagram showing coherent and noncoherent reflections of carrier signals from smooth and rough surfaces respectively to a receiver, upon which embodiments of the present teachings may be implemented.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read-only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The terms "computer-readable medium" or "computer program product" as used herein refer to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer-readable media or computer program products may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium or a computer program product includes a compact disc read-only memory (CD-ROM) as is known in the art for storing software. The computer-readable medium or computer program product is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing the present teachings. Additionally, the described implementation includes software but the present teachings may be implemented as a combination of hardware and software or in hardware alone. The present teachings may be implemented with both object-oriented and non-object-oriented programming systems.

Carrier Signal Tracking for Topographical Height Estimation

As described above, radio signals reflected from the earth's surface can be used to derive the properties of the reflection surface. The carrier phase measurement from surface-reflected radio signals enables high-precision remote sensing applications, such as sea level and sea ice monitoring, terrain topography, snow-water-equivalent (SWE) measurements, etc. However, the carrier phase measurement can only be obtained from coherent reflections. Coherent reflection occurs when the reflection surface is relatively smooth, i.e., if the roughness of the reflection surface is comparable to or larger than the signal wavelength, the reflection is non-coherent. For example, few studies have shown coherent reflection observations of GNSS signals over open ocean from a space-borne platform. This is because the ocean surface is relatively rough. Only a small amount of coherent signal exists in the reflected signals at low-grazing angles when the ocean surface is relatively calm. In addition, the reflected signal usually has a low SNR and large signal amplitude fluctuations caused by multipath interferences, which impose great challenges in the receiver carrier signal processing.

Few technologies have been developed specifically for processing radio signals of coherent reflections. Most of the current GNSS-R missions and experiments follow an OL signal tracking technique which was originally proposed for radio occultation.

In the OL signal tracking technique, the received reflected radio signal is correlated with the reference signal which is generated based on a specular reflection model. Through specular reflection modeling, the range and range rate of the reflected signal transmission path are estimated based on the transmitter PVT (usually obtained from orbit parameters, such as GNSS almanac and ephemeris) and receiver PVT (usually obtained from a navigation processor). The range and range rate from the specular reflection model are converted to code phase and Doppler frequency, based on which the reference signal is generated. The carrier phase in the reference signal is the accumulated Doppler frequency, in radians, over time. A carrier phase discriminator is applied to measure the carrier phase error of the reference signal. Then, the carrier phase-based range measurement is obtained by adding the unwrapped carrier phase error measurement to the accumulated Doppler frequency.

Although the OL signal tracking technique is robust and may be sufficient for some circumstances, it lacks accuracy and produces frequent occurrences of discontinuities (often referred to as carrier phase cycle-slips) in measurements, which is important for high-precision remote sensing applications. For reflected radio signals with only a small amount of coherent component, a low SNR, and severe multipath interferences, OL measurements are especially unreliable.

One OL signal tracking technique, which is described above, is MS-OL processing. In MS-OL processing, a carrier signal replica is generated based on a Doppler model. The carrier signal replica is then correlated with the reflected GNSS signal to provide $C/N_0$ and $\Delta\phi$ estimates for the signal. The MS-OL carrier tracking method is simple to implement and has excellent robustness. However, when $C/N_0$ is low or when the reflected carrier signal experiences multipath interferences, the MS-OL tracking results can be noisy, and the errors produced can accumulate in the carrier phase observation and cause numerous phase discontinuities.

In order to overcome the noisy tracking results produced by MS-OL carrier tracking processing, ACL processing was developed. As described above, when properly tuned, ACL processing provides improved accuracy and fewer phase discontinuities in carrier phase measurements as compared to MS-OL processing or the conventional closed-loop PLL processing.

The ACL carrier tracking method provides improved results over OL carrier tracking methods by taking advantage of the characteristics of signal dynamics and adaptive filter tuning based on a real-time estimated $C/N_0$. However, one problem with using ACL processing for GNSS-R signal tracking is that its performance is dependent on accurate initialization and tuning. ACL processing can lose lock of the reflected signal when there is not a sufficient amount of coherent signal.

In summary, both MS-OL carrier tracking processing and ACL carrier tracking have been used to provide $C/N_0$ and $\Delta\phi$ estimates for a reflected carrier signal, which were then used, in turn, to estimate topological surface heights with a resolution on the order of centimeters. However, when the $C/N_0$ of the reflected signal was low, MS-OL processing was found to produce phase discontinuities and, when the amount of coherent reflected signal was reduced, ACL processing was found to lose lock of the reflected signal. As a result, additional systems and methods are needed to provide signal tracking of reflected carrier signals without phase discontinuities and without losing lock of the reflected signals.

In various embodiments, AHT processing is used to provide signal tracking of reflected carrier signals without phase discontinuities and without losing lock of the reflected signals. Most generally, AHT processing uses both the Doppler model of MS-OL processing and the feedback loop of ACL processing to develop a replica carrier signal for correlation with received reflected carrier signal.

Previously, it was not thought possible or advantageous to combine features of MS-OL processing and ACL processing. For example, MS-OL processing's simplicity (due to no feedback loop) and ability to be used in real-time gave it advantages over ACL processing. Similarly, ACL processing's replacement of the Doppler model with feedback from previous results provided better $\Delta\phi$ estimates than MS-OL.

In various embodiments, however, features of MS-OL processing and ACL processing are combined. However, AHT processing still differs from MS-OL processing. Some significant differences between AHT processing and OL processing, in general, are described as follows:

The reference signal in AHT processing is generated using the code phase and Doppler frequency obtained from the specular reflection model and the carrier phase obtained from the closed-loop feedback of estimated signal parameters.

An estimator is applied to estimate the Doppler frequency and carrier phase of the reflected radio signal. In some embodiments, the present technology adopts a state-space problem formulation based on the signal dynamics modeling, the measurement modeling, and the characterization of signal dynamics noise and measurement noise. In some embodiments, the information of receiver platform dynamics, the $C/N_0$ of the received signal, and the properties of the reflection surfaces can be obtained from external sources or real-time estimation and be used to adaptively adjust the filter parameters to achieve an optimal filtering performance.

In some embodiments of the present technology, the DLOS signal processing outputs are used to aid the reflected signal processing. For example, the estimated signal parameters and the decoded navigation data bits of the DLOS signal are used to model the signal parameters and wipe off the data bits of the reflected signal.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a space-borne GNSS-R environment to accurately show an implementation of the technology in a GNSS-R receiver, other embodiments of the present technology are equally applicable to various other applications. The scope of the present technology is intended to cover all such embodiments that may fall within the scope of the appended claims, either literally or under the doctrine of equivalents. For example, the radio signal transmitted from a communication satellite and the radio signal received on an airborne platform can also be processed by the technology disclosed.

Figure 4:
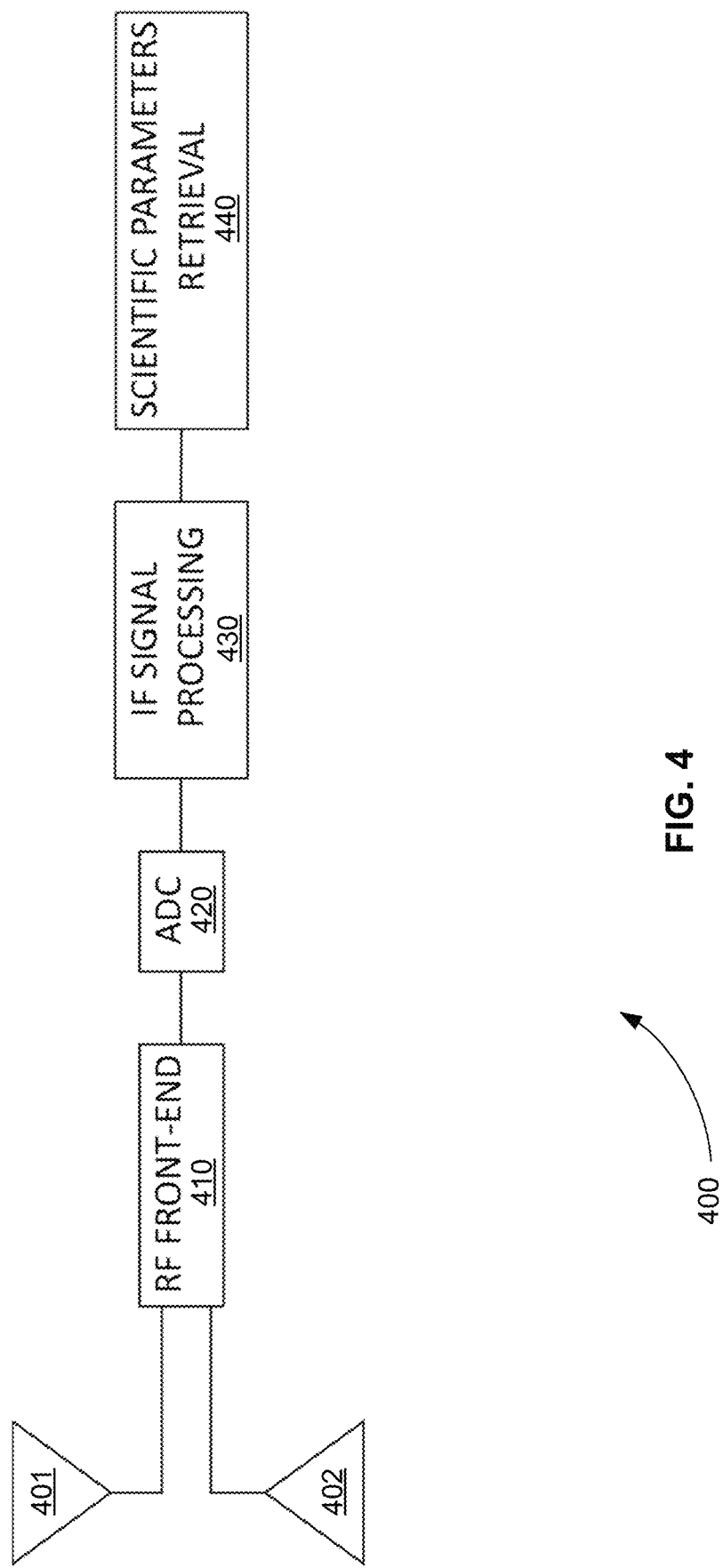
FIG. 4 is an exemplary block diagram of a GNSS-R receiver showing the location of IF signal processing, upon which embodiments of the present teachings may be implemented.
Figure 5:
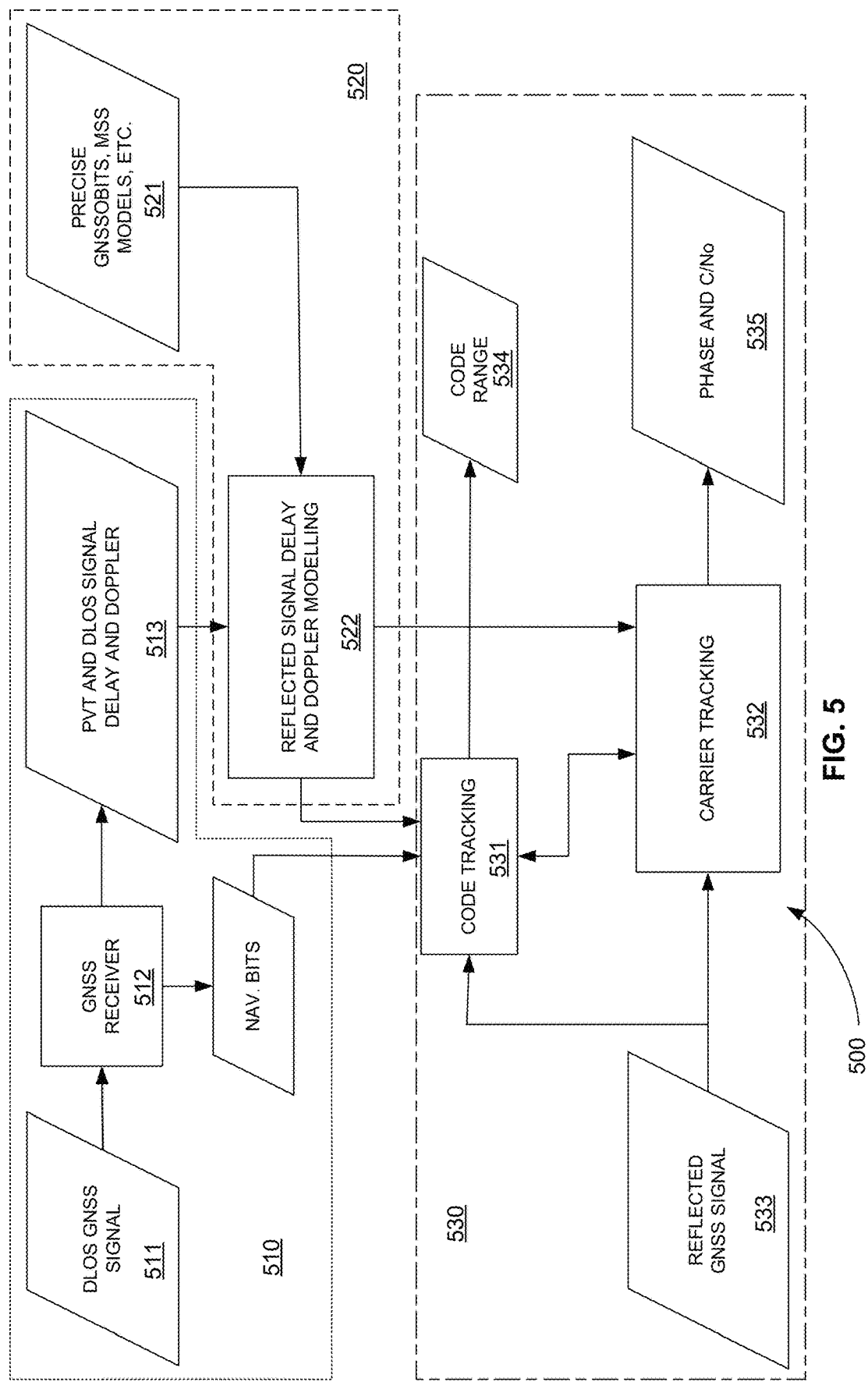
FIG. 5 is an exemplary block diagram showing the IF signal processing in a GNSS-R receiver used to account for low SNR, large signal amplitude fluctuations, and signal frequency shifts due to the Doppler effect, upon which embodiments of the present teachings may be implemented.
Figure 6:
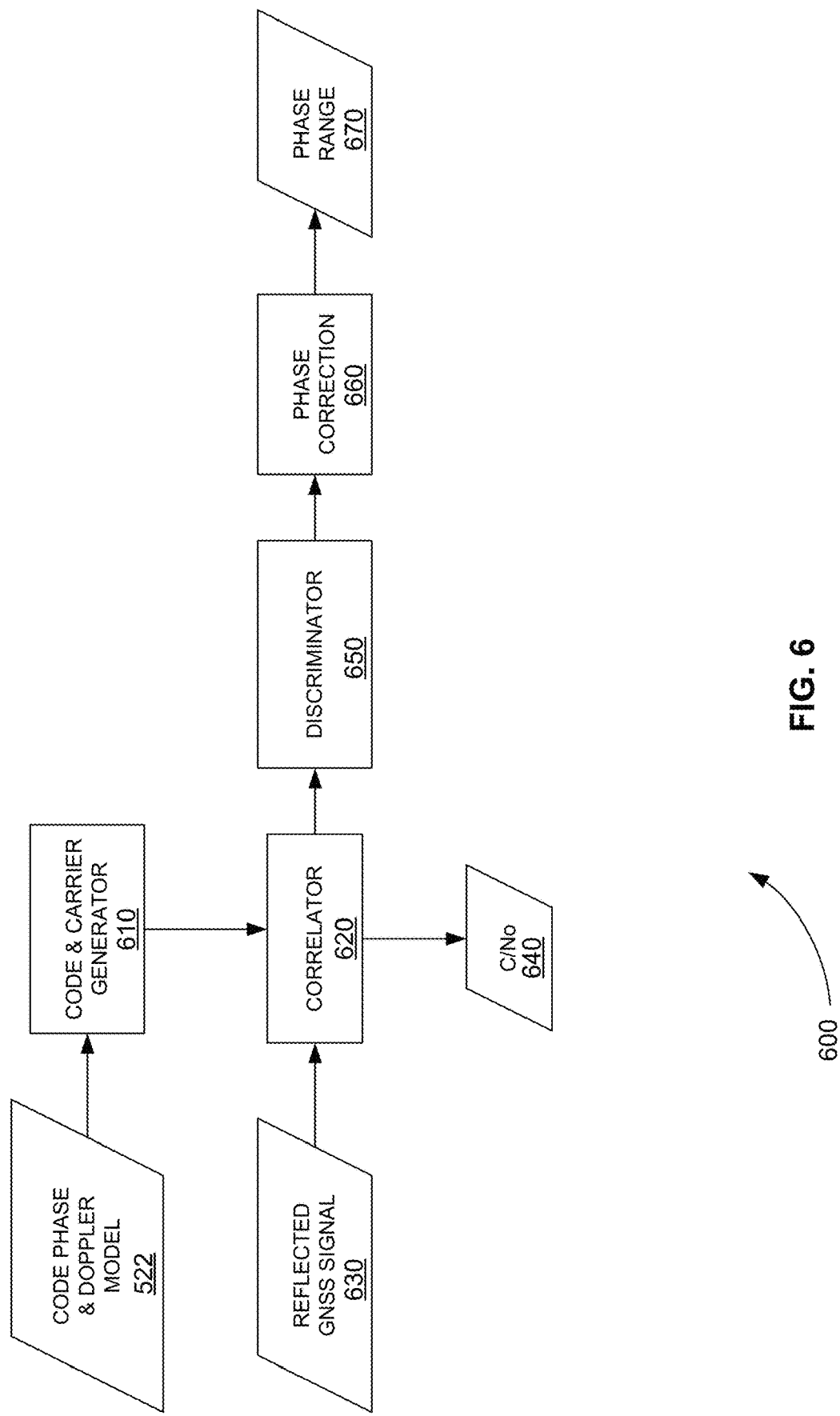
FIG. 6 is an exemplary block diagram showing MS-OL carrier tracking processing, upon which embodiments of the present teachings may be implemented.
Figure 7:
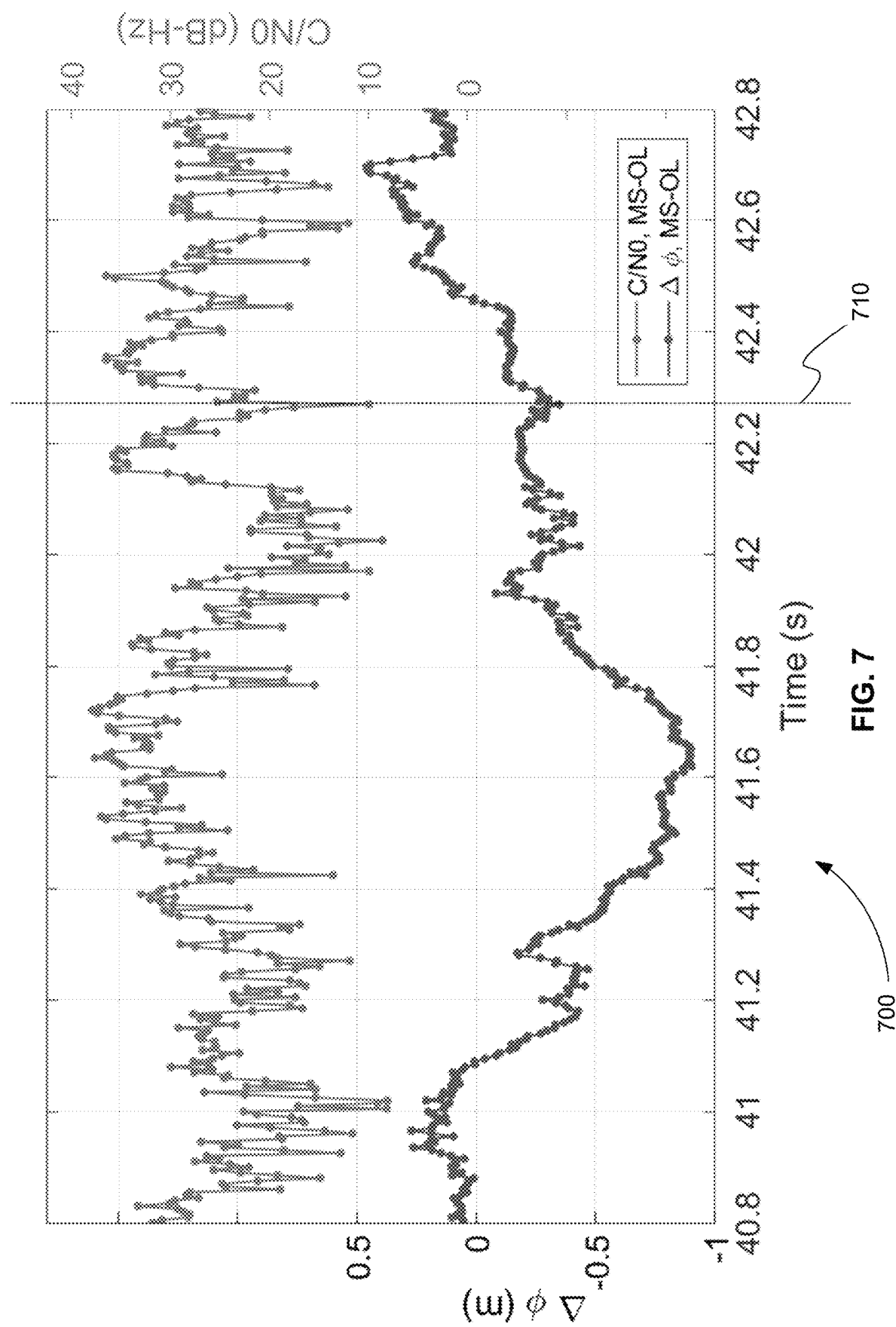
FIG. 7 is an exemplary plot of the $(C/N_0)$ and the $\Delta\phi$ of a reflected GNSS carrier signal estimated using MS-OL carrier tracking processing, upon which embodiments of the present teachings may be implemented.
Figure 8:
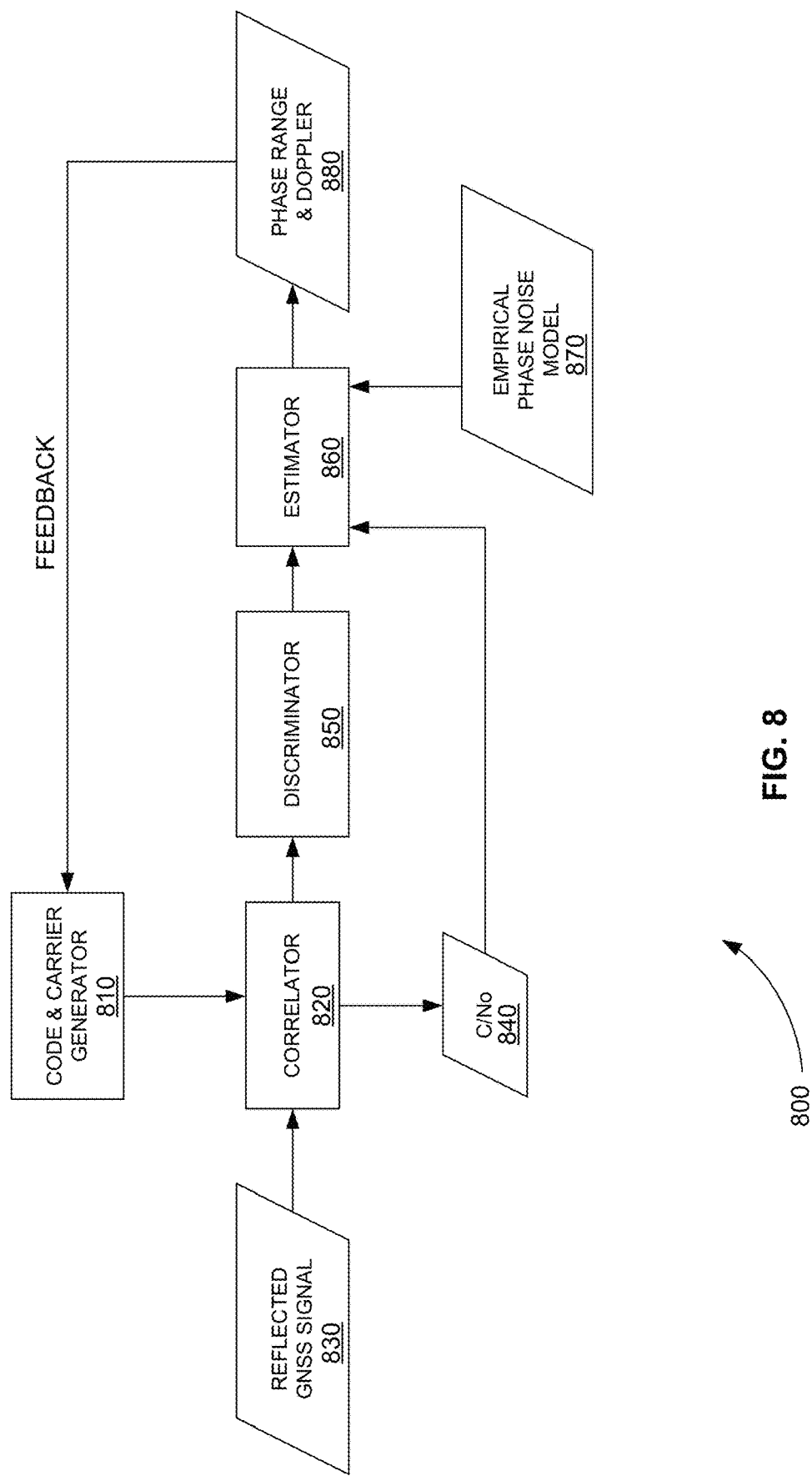
FIG. 8 is an exemplary block diagram showing ACL carrier tracking processing, upon which embodiments of the present teachings may be implemented.

As described above, FIG. 4 shows the location of IF signal processing a GNSS-R receiver. FIG. 5 shows generically the type of IF signal processing performed in a GNSS-R receiver in order to account for low signal SNR, large signal amplitude fluctuations, and signal frequency shifts due to the Doppler effect.

Figure 9:
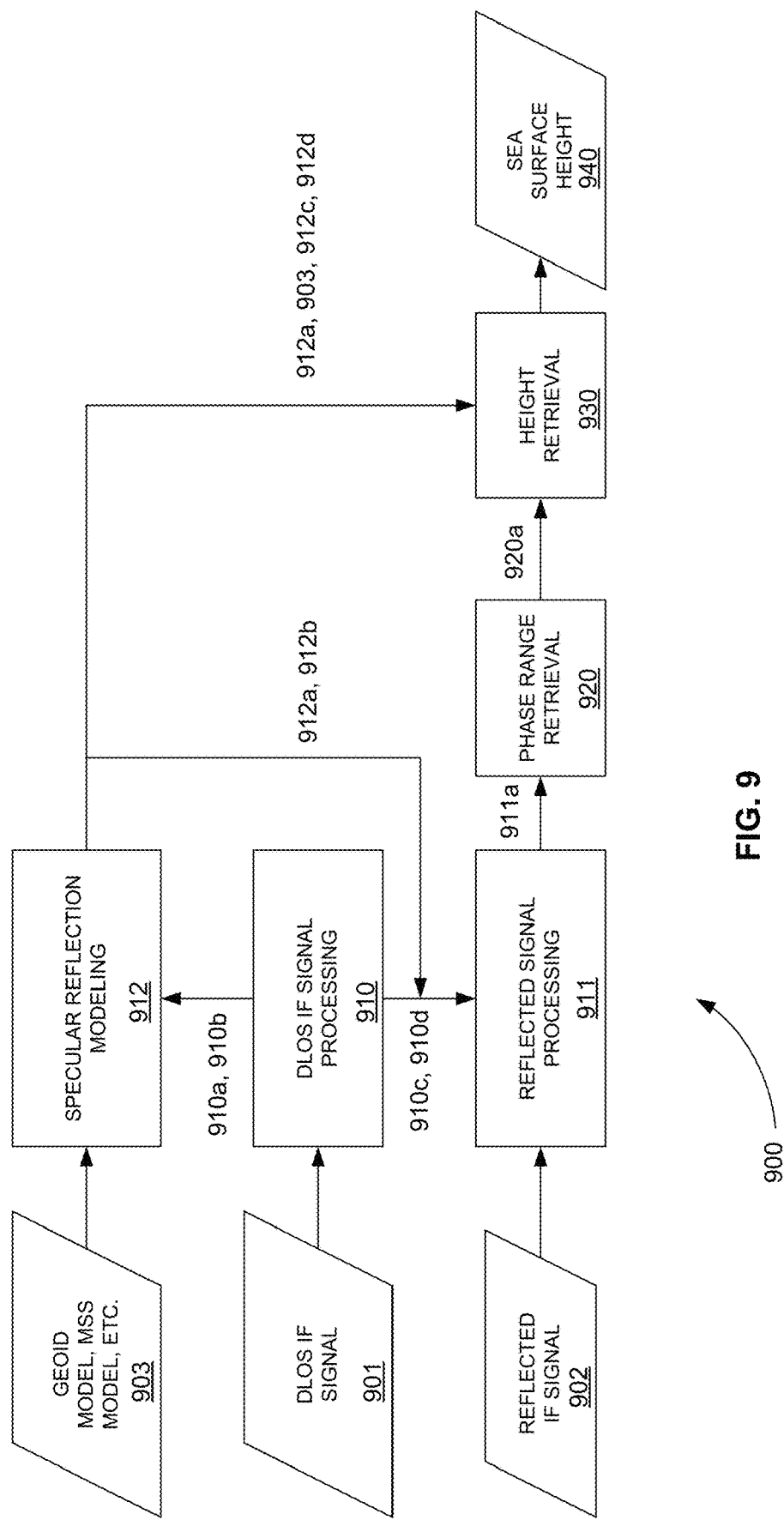
FIG. 9 is an exemplary block diagram showing the IF signal processing used to implement AHT processing, in accordance with various embodiments.

FIG. 9 is an exemplary block diagram 900 showing the IF signal processing used to implement AHT processing, in accordance with various embodiments. The IF signal processing of FIG. 9 takes place in IF signal processing system 430 of the GNSS-R receiver of FIG. 4, for example.

FIG. 9 includes DLOS IF signal processing module 910, reflected IF signal processing module 911, and specular reflection modeling module 912. The input to DLOS IF signal processing module 910 includes the DLOS IF signal

901. The input to reflected IF signal processing module 911 includes reflected IF signal 902. The input to specular reflection modeling module 912 is parameters 903, including, but not limited to, a Geoid model or a mean sea surface (MSS) model.

DLOS IF signal processing module 910 includes navigation processing, which includes signal acquisition, signal tracking, and providing a navigation solution. The output of the DLOS IF signal processing system 910 includes estimated PVT parameters 910*a* of the receiver platform, GNSS satellite orbit parameters 910*b*, signal parameters of the DLOS signal 910*c*, and decoded navigation data bits 910*d*.

Specular reflection modeling module 912 calculates GNSS satellite PVT 912*c*, the SP location 912*d*, the range difference 912*a* between the DLOS signal and the reflected signal, and the range rate difference 912*b* between the DLOS signal and the reflected signal.

Reflected IF signal processing system 911 implements AHT processing to estimate the signal parameters and the C/N$_0$ of the reflected radio signal. The input to reflected IF signal processing system 911 includes estimated signal parameters of the DLOS signal 910*c*, decoded navigation data bits 910*d*, range difference 912*a* between the DLOS signal and the reflected signal, and range rate difference 912*b* between the DLOS signal and the reflected signal. The output of reflected IF signal processing system 911 is estimated signal parameters 911*a* of the reflected signal.

Phase range retrieval module 920 retrieves carrier phase-based range measurements 920*a* from the estimated signal parameters 911*a* of the reflected signal. Phase range retrieval module 920 includes the conversion from a radio signal carrier phase to a range (not shown), cycle-slips detection and correction (not shown), and a smoother for the phase range measurements (not shown).

Sea surface height 940 is retrieved from height retrieval module 930 using carrier phase-based range measurements 920*a*, GNSS satellite PVT 912*c*, the (SP) location 912*d*, the range difference 912*a* between the DLOS signal and the reflected signal, and the mean sea surface model 903.

Figure 16:
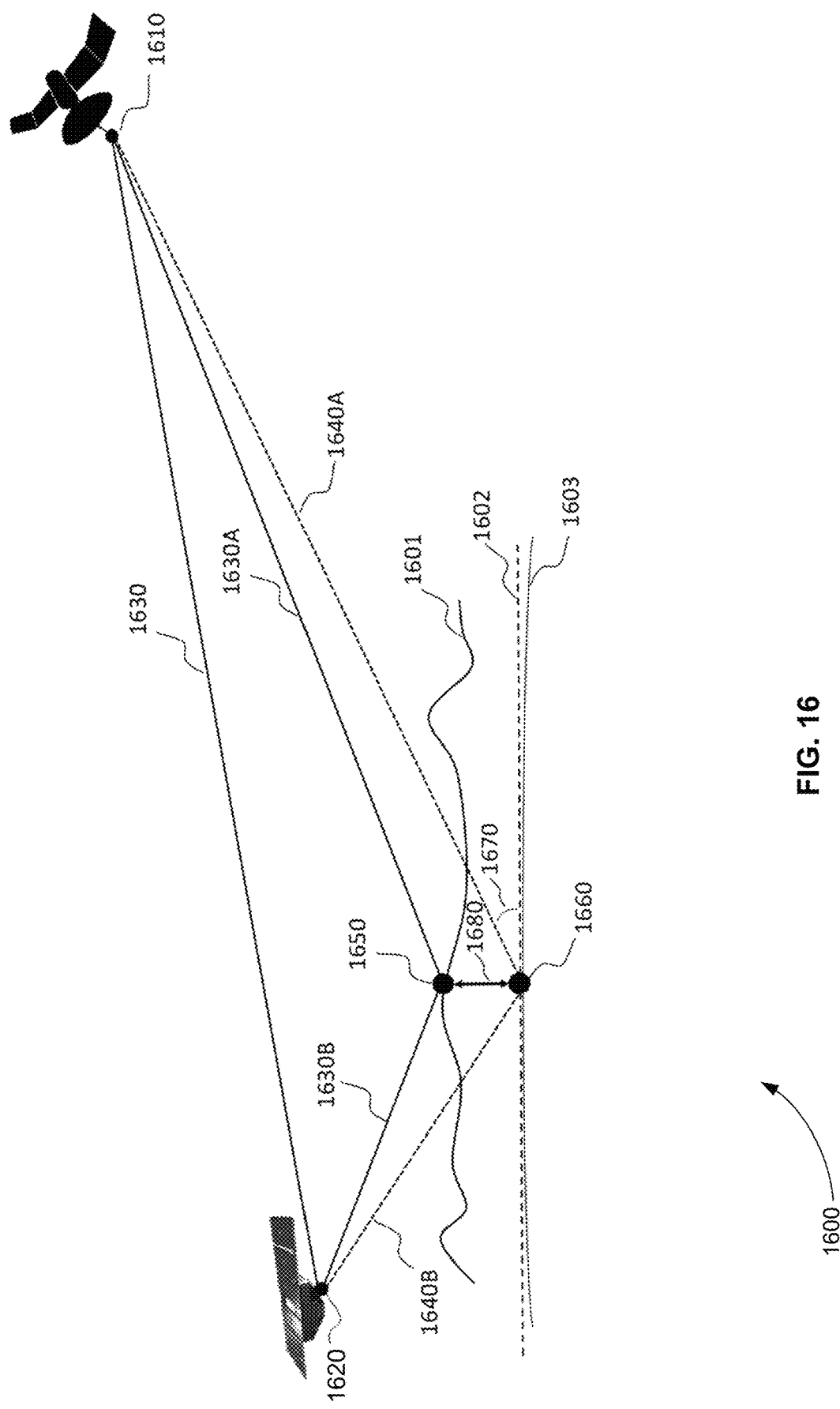
FIG. 16 is an exemplary diagram illustrating sea surface height retrieval using GNSS-R, in accordance with various embodiments.

FIG. 16 is an exemplary diagram 1600 illustrating sea surface height retrieval using GNSS-R, in accordance with various embodiments. As shown in FIG. 16, the sea surface height 940 of FIG. 9 is retrieved by estimating the altitude of SP 1650. Based on the location of the GNSS satellite 1610 when the signal is transmitted, the location of the LEO satellite 1620 when the signal is received, and the mean sea surface model 903 of FIG. 9, the location of SP 1660 can be predicted, and the total range of the reflected signal transmission paths 1640*a* and 1640*b* can be predicted and denoted as RPred. The total carrier phase-based range of the reflected signal transmission paths 1630*a* and 1630*b* is measured through reflected GNSS signal processing as 920*a* of FIG. 9 and denoted as RMeas. The measured altitude error ΔH 1680 of the predicted SP 1660 is obtained as $$\Delta H = \frac{R_{Meas} - R_{Pred}}{2\cos(\theta)},$$

where θ is the elevation angle 1670 at SP 1660. Then, the altitude of SP 1650 is estimated by correcting the altitude of predicted SP 1660 using the measured altitude error 1680, so that the sea surface height 940 of FIG. 9 is retrieved.

Adaptive Hybrid Carrier Tracking

Figure 10:
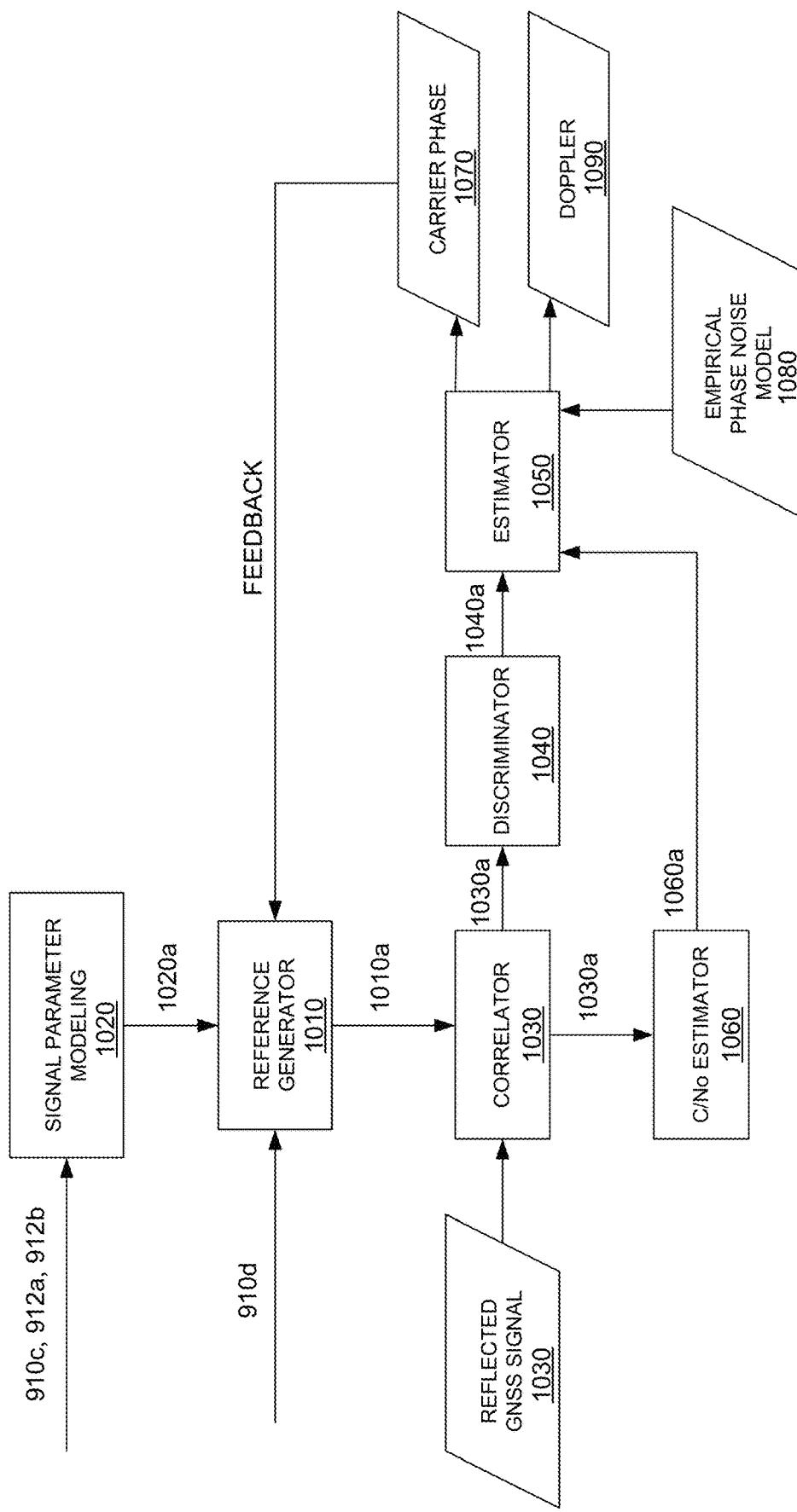
FIG. 10 is an exemplary block diagram showing AHT processing, in accordance with various embodiments.

FIG. 10 is an exemplary block diagram 1000 showing AHT processing, in accordance with various embodiments. As shown in FIG. 10, AHT processing is performed using signal parameter modeling module 1020, reference generator 1010, correlator 1030, discriminator 1040, estimator 1050, and C/N$_0$ estimator 1060.

Using the inputs of the estimated signal parameters of the DLOS signal 910*c*, the range difference 912*a* between the DLOS signal and the reflected signal, and the range rate difference 912*b* between the DLOS signal and the reflected signal, signal parameter modeling module 1020 generates the modeled signal parameters 1020*a*, i.e., code phase and Doppler frequency, which are inputs to reference generator 1010. Other inputs to reference generator 1010 include decoded navigation data bits 910*d* and the feedback of estimated carrier phase 1070. Reference generator 1010 generates reference signals 1010*a* with in-phase (I) and quadrature-phase (Q) carriers, respectively, and with navigation data bits modulated in it. If the received GNSS signals are not in the baseband, i.e., IF≠0 (Hz), the reference signals are generated with the IF carrier component in it, which means the carrier frequency is equal to the summation of the Doppler frequency and the IF.

Correlator 1030 correlates input reflected IF signal 1030 with the reference signals 1010*a* to obtain correlation results 1030*a*, i.e., I and Q. C/N$_0$ estimator 1060 and discriminator 1040 utilize correlation results 1030*a* to estimate C/N$_0$ 1060*a* and carrier phase error measurement 1040*a* (Δϕ), respectively.

Estimator 1050 is controlled by the C/N$_0$ 1060*a* from C/N$_0$ estimator 1060 to adjust the filter parameters to eliminate the noise in carrier phase measurement 1040*a*. Empirical phase noise model 1080 can also be incorporated into estimator 1050. The outputs of estimator 1050 include carrier phase estimation 1070 and the Doppler frequency estimation 1090.

Adaptive Hybrid Tracking Operations

Figure 11:
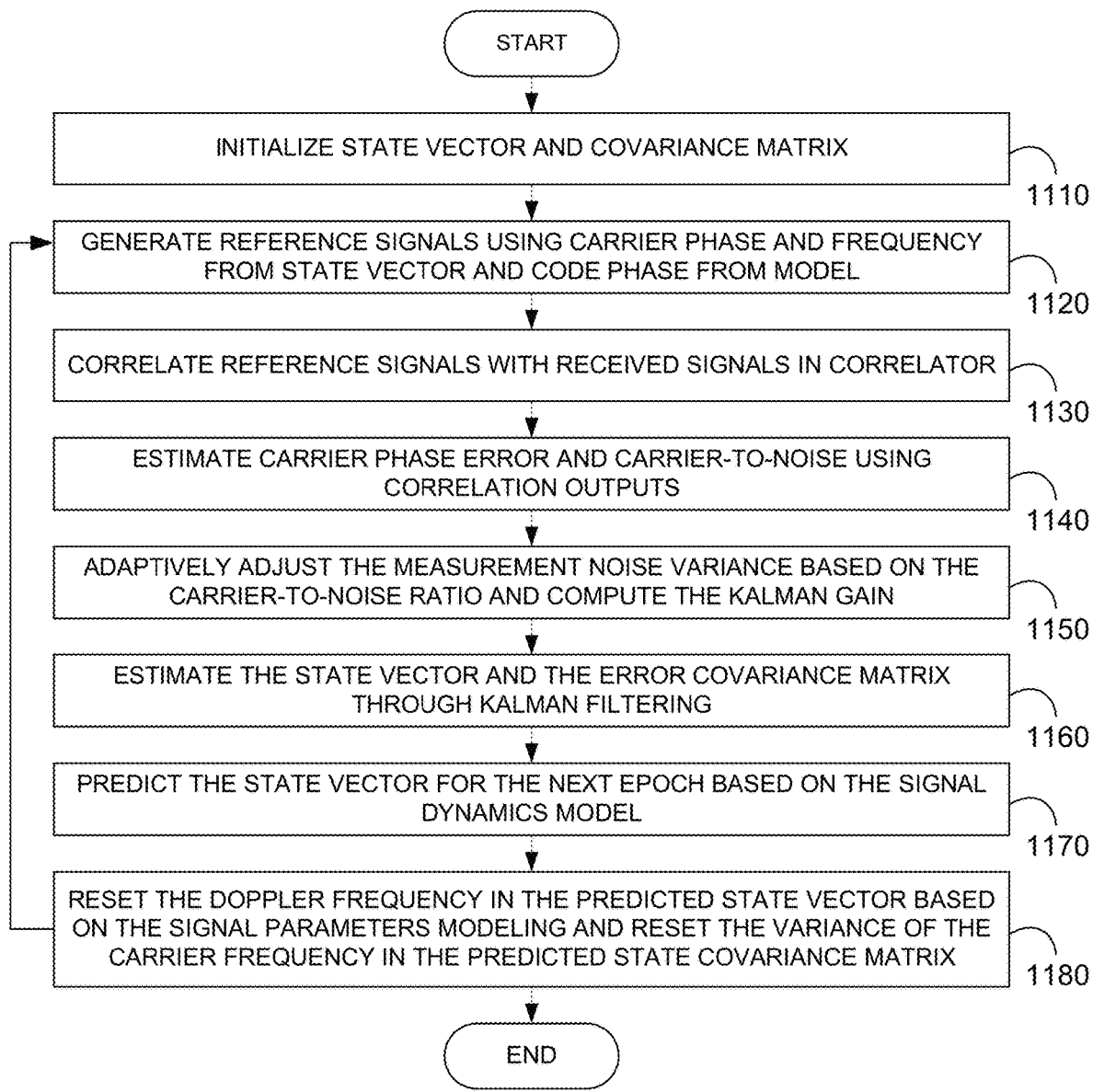
FIG. 11 is an exemplary flowchart showing a set of operations for applying AHT processing using a Kalman filter as an example of the estimator of FIG. 10, in accordance with various embodiments.

FIG. 11 is an exemplary flowchart showing a set of operations for applying AHT processing using a Kalman filter as an example of estimator 1050 of FIG. 10, in accordance with various embodiments. Estimator 1050 of FIG. 10 is not limited to a Kalman filter and can be, but is not limited to, a proportional integral filter or a Weiner filter.

Let $x_{i,k+1} = [\varphi_i \; \omega_i]_{k+1}^T$ represent the i$^{th}$ carrier state at the k+1$^{th}$ epoch, where i=1, 2 represent GPS L1 and L2 signals, $\varphi_i$ and $\omega_i$ represent the carrier phase (rad) and Doppler frequency (rad/s). Let $\delta\varphi_{i,k}$ represent the carrier phase error measurement 1040*a* of the i$^{th}$ carrier at the k$^{th}$ epoch. Estimator 1050, e.g., the Kalman filter, estimates the carrier state based on the previous state estimation $\hat{x}_{i,k}$ and the carrier phase error measurement $\delta\varphi_{i,k+1}$:

$$\hat{x}_{i,k+1} = A\hat{x}_{i,k} + AL_{i,k+1}\delta\varphi_{i,k+1} \quad (1)$$

where A is the transition matrix and has the following form:

$$A = \begin{bmatrix} 1 & T \\ 0 & 1 \end{bmatrix}, \quad (2)$$

$L_{i,k+1}$ is the 2×1 dimensional Kalman gain controlled by the estimated signal C/N$_0$ 1060*a*.

The following description illustrates in greater detail the operations of various embodiments.

Returning to FIG. 11, in step 1110, the state vector $x_{i,k}$ and the covariance matrix of the Kalman filter are initialized. Three separate steps follow step 1110: the local reference signals are generated in step 1120 based on the state vector $x_{i,k}$ and the code phase from signal parameter modeling module 1020 of FIG. 10, the reference signals are correlated with the received signals in step 1130, and the carrier discriminator determines carrier error measurements and the $C/N_0$ estimator determines the signal $C/N_0$, both using the correlation outputs, in step 1140. Following step 1140, the Kalman gain is determined based on the estimated signal $C/N_0$ in step 1150. Next, in step 1160, an estimation of the state vector is determined by the Kalman filter as described in Equation (1). The state vector for the next epoch is predicted based on the state dynamics model in step 1170. Then, in step 1180, the Doppler frequency $\omega_i$ in the predicted state vector is reset based on signal parameter modeling module 1020 of FIG. 10 and, meanwhile, the variance of Doppler frequency in the predicted state covariance matrix is reset as well. Each step 1180 leads back to step 1120, reinitializing the process.

Receiver for Tracking $C/N_0$ and $\Delta\phi$ of a Reflected Carrier Signal

Figure 12:
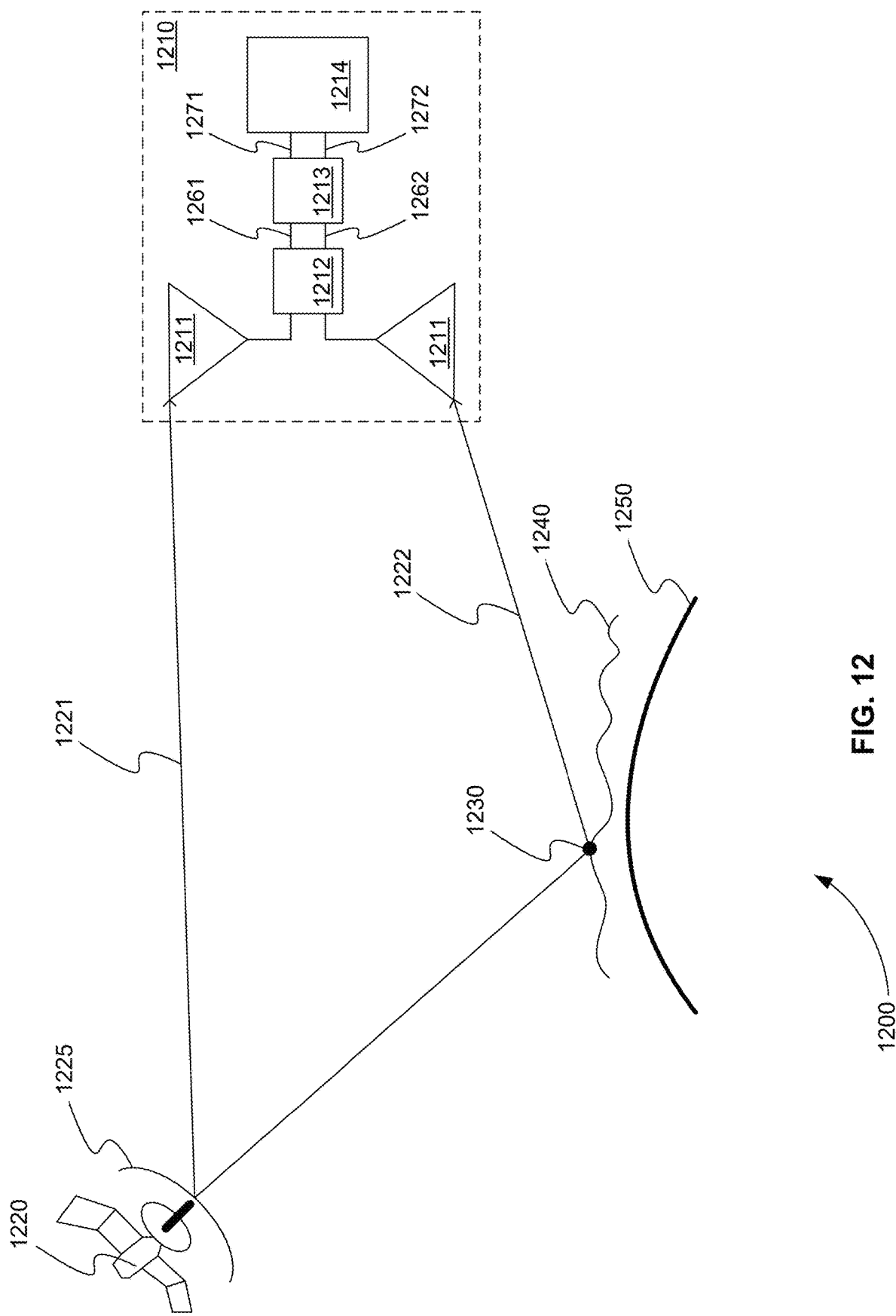
FIG. 12 is an exemplary diagram of a receiver for tracking a $C/N_0$ and a $\Delta\phi$ of a reflected RF carrier signal, in accordance with various embodiments.

FIG. 12 is an exemplary diagram 1200 of a receiver for tracking a $C/N_0$ and a $\Delta\phi$ of a reflected RF carrier signal, in accordance with various embodiments. Receiver 1210 includes one or more antennas 1211, RF front-end circuitry 1212, ADC 1213, and processor 1214.

One or more antennas 1211 receive DLOS RF signal component 1221 and RF signal component 1222 of RF carrier signal 1225. RF signal component 1222 is reflected from point 1230 on surface 1240 of earth 1250. RF carrier signal 1225 is transmitted from transmitter 1220 located above surface 1240 of earth 1250.

RF front-end circuitry 1212 down-converts DLOS RF signal component 1221 to DLOS IF signal 1261. RF front-end circuitry 1212 also down-converts RF signal component 1222 that is reflected from point 1230 to reflected IF signal 1262.

ADC 1213 converts DLOS IF signal 1261 to digital DLOS IF signal 1271. ADC 1213 also converts reflected IF signal 1262 to digital reflected IF signal 1272.

Processor 1214 is used to receive signals, process signals, produce data, or provide control instructions. Processor 1214 can be part of receiver 1210, as shown in FIG. 12, or can be a separate device, for example. Processor 1214 can be, but is not limited to, a controller, a computer, a microprocessor, the computer system of FIG. 1, or any device capable of sending, receiving, and processing signals and data.

Processor 1214 generates modeled reference signal parameters using digital DLOS IF signal 1271 and known locations of one or more antennas 1211, transmitter 1220, and point 1230. Processor 1214 generates a reference signal based on the modeled reference signal parameters and feedback of a previously estimated $\Delta\phi$. Processor 1214 correlates the reference signal with digital reflected IF signal 1272 to produce in-phase (I) and quadrature-phase (Q) correlation results. Processor 1214 calculates an estimated $C/N_0$ and an estimated $\Delta\phi$ for digital reflected IF signal 1272 from the correlation results.

In various embodiments, one or more antennas 1211 can include a first antenna to receive DLOS RF signal component 1221 and a second antenna to receive RF signal component 1222 that is reflected from point 1230, as shown in FIG. 12.

In various embodiments, processor 1214 further calculates a centimetric height at point 1230 from the estimated $\Delta\phi$.

In various embodiments, RF carrier signal 1225 is a GNSS carrier signal and the locations of one or more antennas 1211, transmitter 1220, and point 1230 are determined from information carried by the GNSS carrier signal.

In various embodiments, RF carrier signal 1225 is a carrier signal of a communications system and the locations of the one or more antennas, the transmitter, and the point are determined from information transmitted separately from ground stations of the communications system.

In various embodiments, the feedback of a previously estimated $\Delta\phi$ is a state vector and the reference signal is generated based on the modeled reference signal parameters and the state vector. The state vector is estimated using a filter, for example. The filter can be, but is not limited to, a Kalman filter, a proportional integral filter, or a Weiner filter.

In various embodiments, processor 1214 further eliminates noise in the estimated $\Delta\phi$ by adjusting parameters of the filter based on the estimated $C/N_0$ and the estimated $\Delta\phi$. Processor 1214 can also adjust parameters of the filter based on an empirical phase noise model.

In various embodiments, processor 1214 calculates the estimated $C/N_0$ and the estimated $\Delta\phi$ in real-time.

Method for Tracking $C/N_0$ and $\Delta\phi$ of a Reflected Carrier Signal

Figure 13:
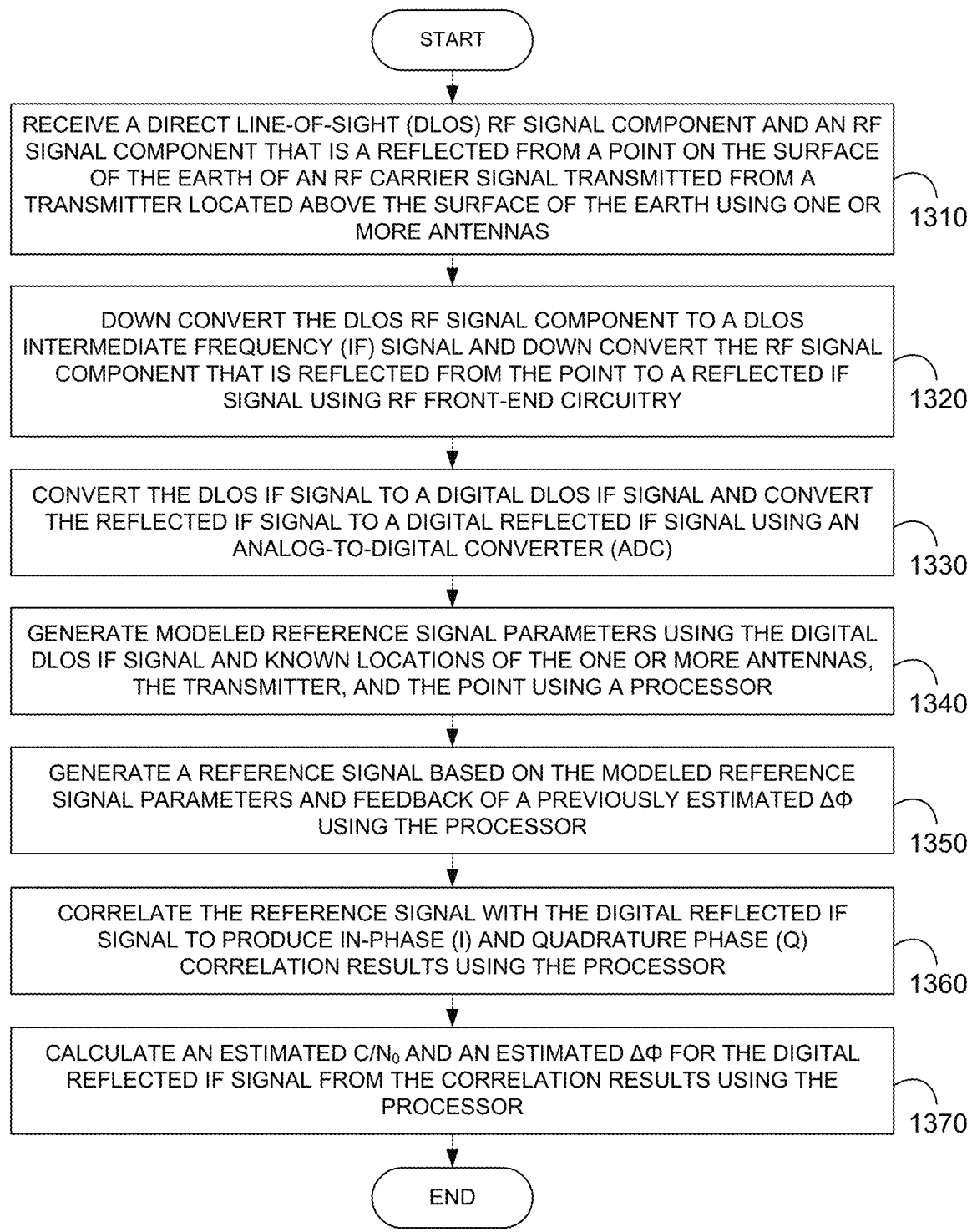
FIG. 13 is an exemplary flowchart showing a method for tracking a $C/N_0$ and a $\Delta\phi$ of a reflected RF carrier signal, in accordance with various embodiments.

FIG. 13 is an exemplary flowchart 1300 showing a method for tracking a $C/N_0$ and a $\Delta\phi$ of a reflected RF carrier signal, in accordance with various embodiments.

In step 1310 of method 1300, a DLOS RF signal component and a reflected RF signal component of an RF carrier signal are received using one or more antennas. The reflected RF signal component is reflected from a point on the surface of the earth. The RF carrier signal is transmitted from a transmitter located above the surface of the earth.

In step 1320, the DLOS RF signal component is down-converted to a DLOS IF signal using RF front-end circuitry. The RF signal component that is reflected from the point is down-converted to a reflected IF signal also using the RF front-end circuitry.

In step 1330, the DLOS IF signal is converted to a digital DLOS IF signal and the reflected IF signal is converted to a digital reflected IF signal using an ADC.

In step 1340, modeled reference signal parameters are generated using the digital DLOS IF signal and known locations of the one or more antennas, the transmitter, and the point using a processor.

In step 1350, a reference signal is generated based on the modeled reference signal parameters and feedback of a previously estimated $\Delta\phi$ using the processor.

In step 1360, the reference signal is correlated with the digital reflected IF signal to produce in-phase (I) and quadrature-phase (Q) correlation results using the processor.

In step 1370, an estimated $C/N_0$ and an estimated $\Delta\phi$ are calculated for the digital reflected IF signal from the correlation results using the processor.

Computer Program Product for Tracking $C/N_0$ and $\Delta\phi$ of a Reflected Carrier Signal In various embodiments, computer program products include a tangible computer-readable storage medium whose contents include a program with instructions being executed on a processor so as to perform a method for tracking C/NO and $\Delta\phi$ of a reflected RF carrier signal. This method is performed by a system that includes one or more distinct software modules.

Figure 14:
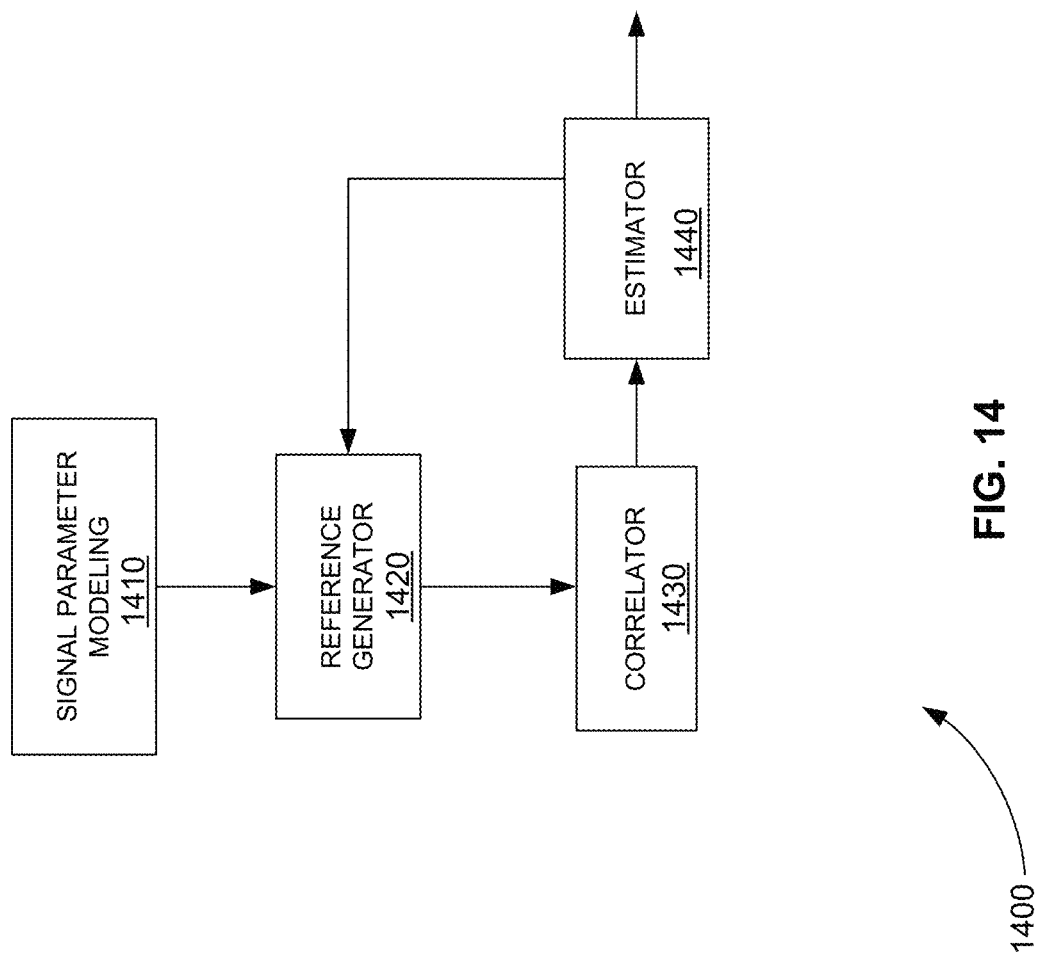
FIG. 14 is a schematic diagram of a system that includes one or more distinct software modules that perform a method for tracking a $C/N_0$ and a $\Delta\phi$ of a reflected RF carrier signal, in accordance with various embodiments.

FIG. 14 is a schematic diagram of a system 1400 that includes one or more distinct software modules that perform a method for tracking $C/N_0$ and $\Delta\phi$ of a reflected RF carrier signal, in accordance with various embodiments. System 1400 includes signal parameter modeling module 1410, reference generator 1420, correlator 1430, and estimator 1440.

Signal parameter modeling module 1410 generates modeled reference signal parameters using a DLOS IF signal and known locations of one or more antennas, a transmitter located above the surface of the earth, and a point on the surface of the earth. A DLOS RF signal component and a reflected RF signal component of an RF carrier signal are received using the one or more antennas. The reflected RF signal component is reflected from the point. The RF carrier signal is transmitted from the transmitter. The DLOS RF signal component is down-converted to a DLOS IF signal using RF front-end circuitry. The reflected RF signal component is down-converted to a reflected IF signal also using the RF front-end circuitry. The DLOS IF signal is converted to the digital DLOS IF signal and the reflected IF signal is converted to a digital reflected IF signal using an ADC.

Reference generator 1420 generates a reference signal based on the modeled reference signal parameters and feedback of a previously estimated $\Delta\phi$.

Correlator 1430 correlates the reference signal with the digital reflected IF signal to produce in-phase (I) and quadrature-phase (Q) correlation results.

Estimator 1440 calculates an estimated $C/N_0$ and an estimated $\Delta\phi$ for the digital reflected IF signal from the correlation results.

Adaptive Hybrid Tracking Improves an RF Receiver

Figure 15:
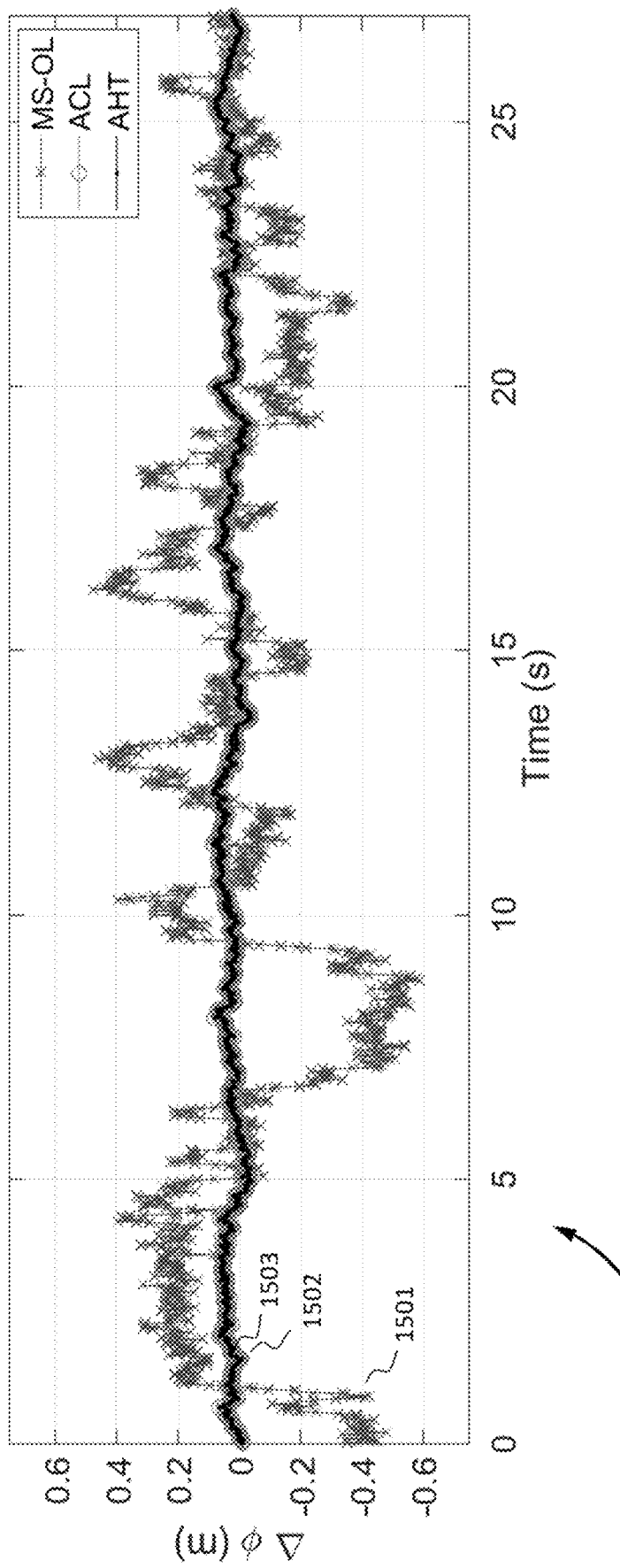
FIG. 15 is an exemplary plot showing how AHT processing can improve an RF receiver by improving the tracking of a reflected RF carrier signal, in accordance with various embodiments.

FIG. 15 is an exemplary plot 1500 showing how AHT processing can improve an RF receiver by improving the tracking of a reflected RF carrier signal, in accordance with various embodiments. In plot 1500, estimated $\Delta\phi$ data values for MS-OL 1501, ACL 1502, and AHT 1503 processing are plotted as a function of time. The time values represent different specular points on the surface of the earth from which a reflected component of the RF carrier signal was analyzed.

Plot 1500, shows that the estimated $\Delta\phi$ data values from MS-OL processing 1501 include many phase discontinuities and large noise, while the $\Delta\phi$ data values from ACL processing 1502 and AHT processing 1503 do not include any phase discontinuity and have less noise than those from MS-OL processing. As mentioned above, ACL processing is impractical for onboard operation in real-time. As a result, AHT processing, as a practical approach for real-time operation, improves an RF receiver by providing signal tracking of reflected carrier signals with fewer phase discontinuities and less noise than the traditional MS-OL processing.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A receiver for tracking a carrier-to-noise ratio ($C/N_0$) and a phase correction ($\Delta\phi$) of a reflected radio frequency (RF) carrier signal, comprising:

one or more antennas that receive a direct line-of-sight (DLOS) RF signal component and an RF signal component that is reflected from a specular point (SP) on the surface of the earth of an RF carrier signal transmitted from a transmitter located above the surface of the earth;

RF front-end circuitry that down-converts the DLOS RF signal component to a DLOS intermediate frequency (IF) signal and down-converts the RF signal component that is reflected from the SP to a reflected IF signal;

an analog-to-digital converter (ADC) that converts the DLOS IF signal to a digital DLOS IF signal and converts the reflected IF signal to a digital reflected IF signal; and a processor that
generates modeled reference signal parameters using the digital DLOS IF signal and known locations of the one or more antennas, the transmitter, and the SP,
generates a reference signal based on the modeled reference signal parameters and feedback of a previously estimated $\Delta\phi$,
correlates the reference signal with the digital reflected IF signal to produce in-phase (I) and quadrature-phase (Q) correlation results, and
calculates an estimated $C/N_0$ and an estimated $\Delta\phi$ for the digital reflected IF signal from the correlation results.

2. The receiver of claim 1, wherein the one or more antennas comprise a first antenna to receive the DLOS RF signal component and a second antenna to receive the RF signal component that is reflected from the SP.

3. The receiver of claim 1, wherein the processor further calculates a centimetric height at the SP from the estimated $\Delta\phi$.

4. The receiver of claim 1, wherein the RF carrier signal comprises a global navigation satellite system (GNSS) carrier signal and the locations of the one or more antennas, the transmitter, and the SP are determined from information carried by the GNSS carrier signal.

5. The receiver of claim 1, wherein the RF carrier signal comprises a carrier signal of a communications system and the locations of the one or more antennas, the transmitter, and the SP are determined from information transmitted separately from ground stations of the communications system.

6. The receiver of claim 1, wherein the feedback of a previously estimated $\Delta\phi$ comprises a state vector and the reference signal is generated based on the modeled reference signal parameters and the state vector.

7. The receiver of claim 6, wherein the state vector is estimated using a filter.

8. The receiver of claim 7, wherein the filter comprises a Kalman filter.

9. The receiver of claim 7, wherein the filter comprises a proportional integral filter.

10. The receiver of claim 7, wherein the filter comprises a Weiner filter.

11. The receiver of claim 8, wherein the processor further eliminates noise in the estimated $\Delta\phi$ by adjusting parameters of the filter based on the estimated $C/N_0$ and the estimated $\Delta\phi$.

12. The receiver of claim 11, wherein the processor further adjusts the parameters of the filter based on an empirical phase noise model.

13. The receiver of claim 1, wherein the processor calculates the estimated $C/N_0$ and the estimated $\Delta\phi$ in real-time.

14. A method for tracking carrier-to-noise ratio ($C/N_0$) and a phase correction ($\Delta\phi$) of a reflected radio frequency (RF) carrier signal, comprising:

receiving a direct line-of-sight (DLOS) RF signal component and an RF signal component that is reflected from a specular point (SP) on the surface of the earth of an RF carrier signal transmitted from a transmitter located above the surface of the earth using one or more antennas;

down-converting the DLOS RF signal component to a DLOS intermediate frequency (IF) signal and down-converting the RF signal component that is reflected from the SP to a reflected IF signal using RF front-end circuitry;

converting the DLOS IF signal to a digital DLOS IF signal and converting the reflected IF signal to a digital reflected IF signal using an analog-to-digital converter (ADC);

generating modeled reference signal parameters using the digital DLOS IF signal and known locations of the one or more antennas, the transmitter, and the SP using a processor;

generating a reference signal based on the modeled reference signal parameters and feedback of a previously estimated $\Delta\phi$ using the processor;

correlating the reference signal with the digital reflected IF signal to produce in-phase (I) and quadrature-phase (Q) correlation results using the processor; and calculating an estimated $C/N_0$ and an estimated $\Delta\phi$ for the digital reflected IF signal from the correlation results using the processor.

15. The method of claim 14, wherein the one or more antennas comprise a first antenna to receive the DLOS RF signal component and a second antenna to receive the RF signal component that is reflected from the SP.

16. The method of claim 14, further comprising calculating a centimetric height at the SP from the estimated $\Delta\phi$.

17. The method of claim 14, wherein the RF carrier signal comprises a global navigation satellite system (GNSS) carrier signal and the locations of the one or more antennas, the transmitter, and the SP are determined from information carried by the GNSS carrier signal.

18. The method of claim 14, wherein the RF carrier signal comprises a carrier signal of a communications system and the locations of the one or more antennas, the transmitter, and the SP are determined from information transmitted separately from ground stations of the communications system.

19. The method of claim 14, wherein the feedback of a previously estimated $\Delta\phi$ comprises a state vector and the reference signal is generated based on the modeled reference signal parameters and the state vector.

20. A computer program product, comprising a non-transitory and tangible computer-readable storage medium whose contents include a program with instructions being executed on a processor to perform a method for tracking a carrier-to-noise ratio ($C/N_0$) and a phase correction ($\Delta\phi$) of a reflected radio frequency (RF) carrier signal, the method comprising:

providing a system, wherein the system comprises one or more distinct software modules, and wherein the distinct software modules comprise a signal parameter modeling module, a reference generator, a correlator, and an estimator;

generating modeled reference signal parameters using a digital direct line-of-sight (DLOS) IF signal and known locations of one or more antennas, a transmitter located above the surface of the earth, and a specular point (SP) on the surface of the earth using the signal parameter modeling module, wherein a DLOS RF signal component and an RF signal component that is reflected from the SP of an RF carrier signal transmitted from the transmitter are received using the one or more antennas, wherein the DLOS RF signal component is down-converted to a DLOS intermediate frequency (IF) signal and the RF signal component that is reflected from the SP is down-converted to a reflected IF signal using RF front-end circuitry, and the DLOS IF signal is converted to the digital DLOS IF signal and the reflected IF signal is converted to a digital reflected IF signal using an analog-to-digital converter (ADC);

generating a reference signal based on the modeled reference signal parameters and feedback of a previously estimated $\Delta\phi$ using the reference generator;

correlating the reference signal with the digital reflected IF signal to produce in-phase (I) and quadrature-phase (Q) correlation results using the correlator; and calculating an estimated $C/N_0$ and an estimated $\Delta\phi$ for the digital reflected IF signal from the correlation results using the estimator.

\* \* \* \* \*